(12) United States Patent
Ooe

(10) Patent No.: US 9,004,471 B2
(45) Date of Patent: Apr. 14, 2015

(54) WORKPIECE ELEVATING SUPPORT DEVICE

(75) Inventor: Masahiro Ooe, Shiga (JP)

(73) Assignee: Daifuku Co., Ltd. (JP)

( * ) Notice: Subject to any disclaimer, the term of this patent is extended or adjusted under 35 U.S.C. 154(b) by 453 days.

(21) Appl. No.: 13/432,988

(22) Filed: Mar. 28, 2012

(65) Prior Publication Data

US 2012/0181735 A1 Jul. 19, 2012

Related U.S. Application Data

(63) Continuation of application No. PCT/JP2010/068117, filed on Oct. 15, 2010.

(30) Foreign Application Priority Data

Oct. 21, 2009 (JP) ................................ 2009-241977

(51) Int. Cl.
| | |
|---|---|
| *B23Q 3/18* | (2006.01) |
| *B66F 7/08* | (2006.01) |
| *B62D 65/18* | (2006.01) |
| *B66F 7/06* | (2006.01) |

(52) U.S. Cl.
CPC . *B66F 7/08* (2013.01); *B62D 65/18* (2013.01); *B66F 7/0641* (2013.01)

(58) Field of Classification Search
USPC .............................. 254/122–126, 133 R, 134
See application file for complete search history.

(56) References Cited

U.S. PATENT DOCUMENTS

| | | | | |
|---|---|---|---|---|
| 7,331,425 | B2 * | 2/2008 | Bukowski et al. | 187/269 |
| 7,866,445 | B2 * | 1/2011 | Bukowski et al. | 187/269 |
| 8,132,518 | B2 * | 3/2012 | Kim et al. | 108/145 |
| 2008/0190707 | A1 * | 8/2008 | Hoth | 187/269 |
| 2012/0181735 | A1 * | 7/2012 | Ooe | 269/17 |
| 2012/0263570 | A1 * | 10/2012 | Polins et al. | 414/800 |

FOREIGN PATENT DOCUMENTS

| | | | |
|---|---|---|---|
| JP | 57037990 | U | 2/1982 |
| JP | 62218305 | A | 9/1987 |
| JP | 3015899 | U | 2/1991 |
| JP | 9295797 | A | 11/1997 |
| JP | 11130383 | A | 5/1999 |
| JP | 2002145588 | A | 5/2002 |
| JP | 2006044926 | A | 2/2006 |

OTHER PUBLICATIONS

International Search Report; Application No. PCT/JP2010/068117, Issued: Jan. 7, 2011; Mailing Date: Jan. 18, 2011; 2 pages.

* cited by examiner

*Primary Examiner* — Lee D Wilson

(74) *Attorney, Agent, or Firm* — St. Onge Steward Johnston & Reens LLC

(57) ABSTRACT

A workpiece elevating support device which can be utilized by being installed in a carriage-type conveying apparatus for conveying an automobile body while changing the height thereof in each section in an automobile assembly line. The workpiece elevating support device includes at least two center-folding double link mechanisms arranged in parallel on a base, each of which is composed of a lower parallel link, an intermediate link member, an upper parallel link, and an upper link member. The upper link member is consecutively provided with a workpiece support. There is juxtaposed a lock to hold the center-folding double link mechanisms in an expanding-rising posture, which is taken when the upper link members are vertically raised to a predetermined height.

18 Claims, 18 Drawing Sheets

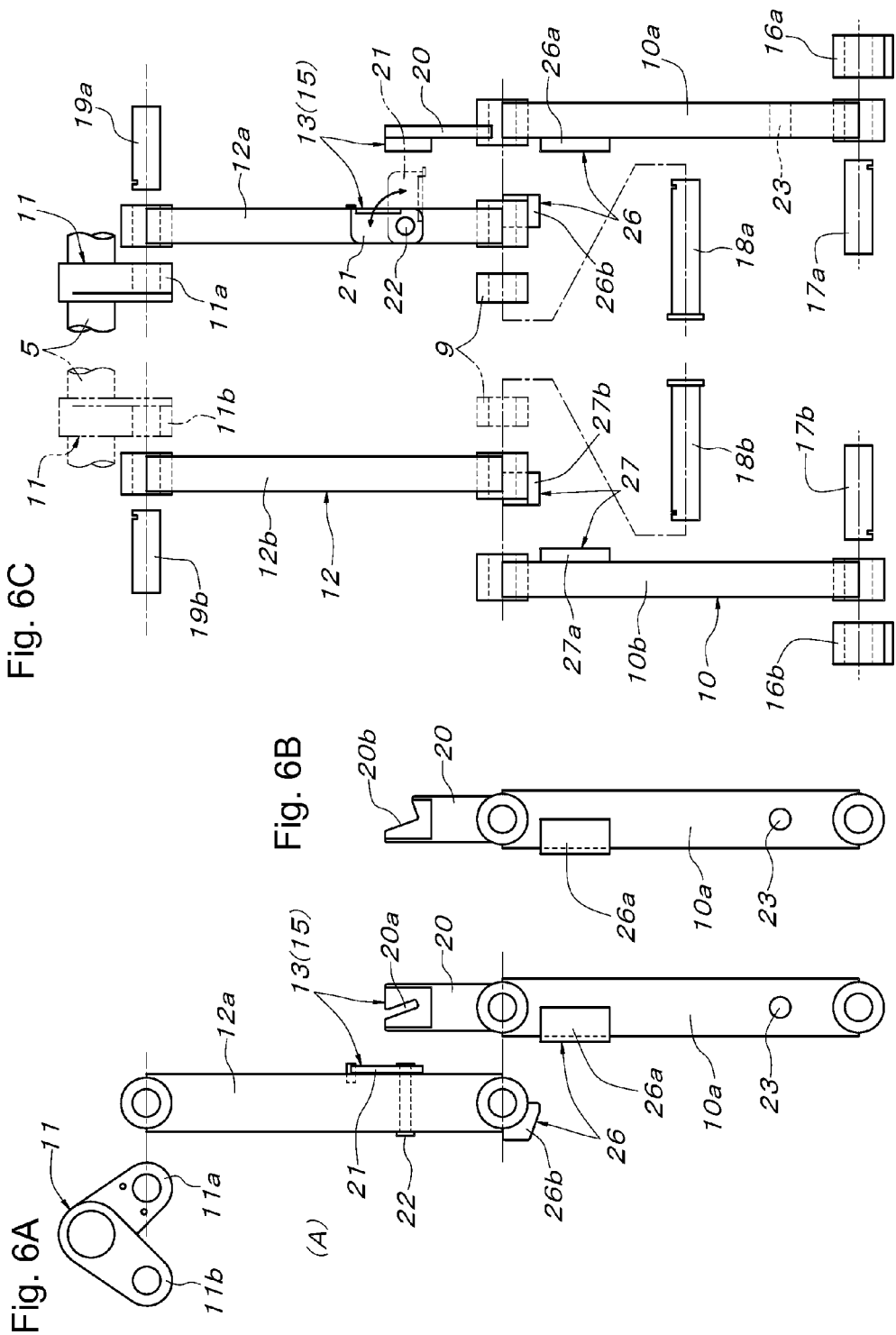

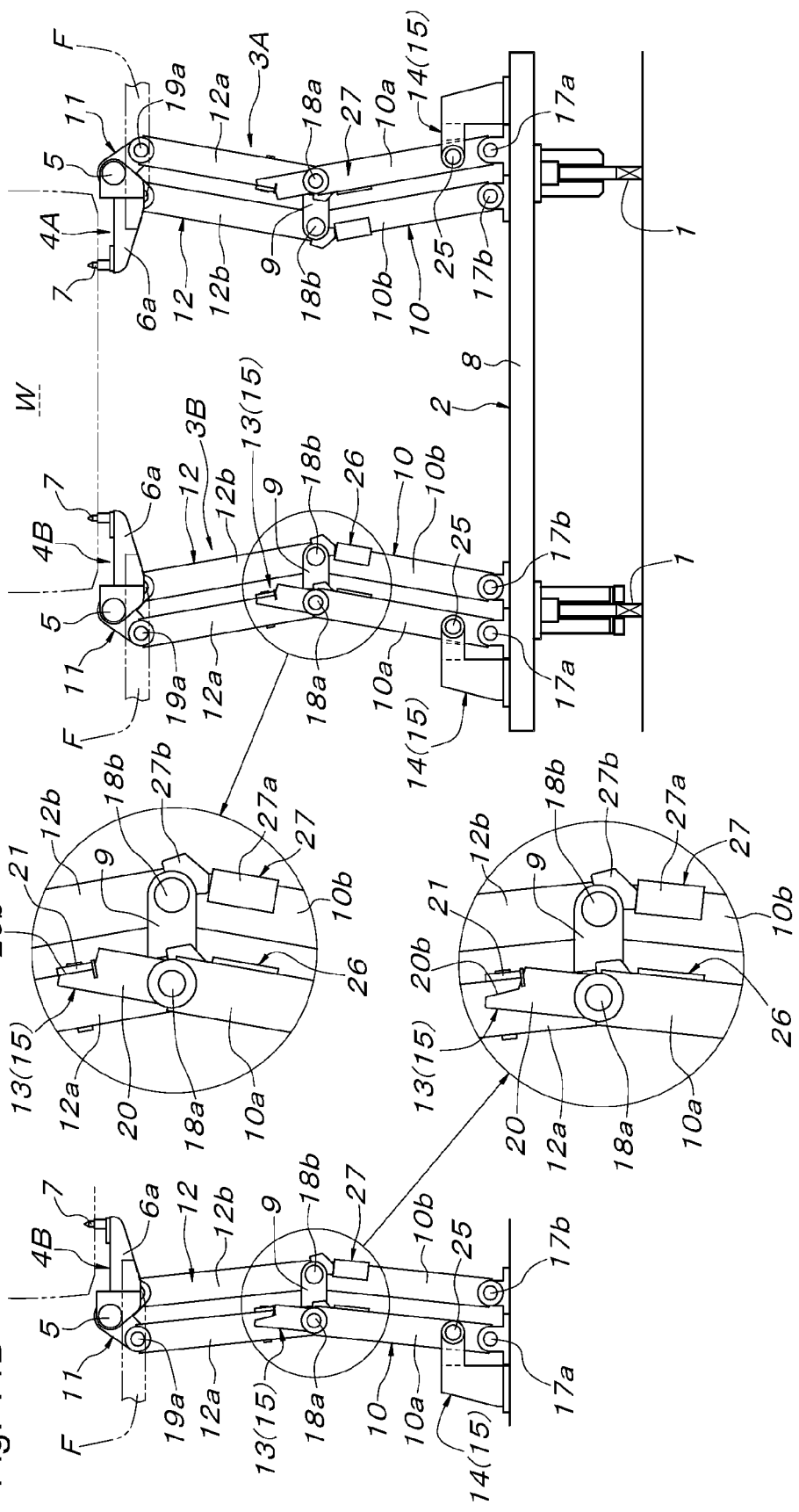

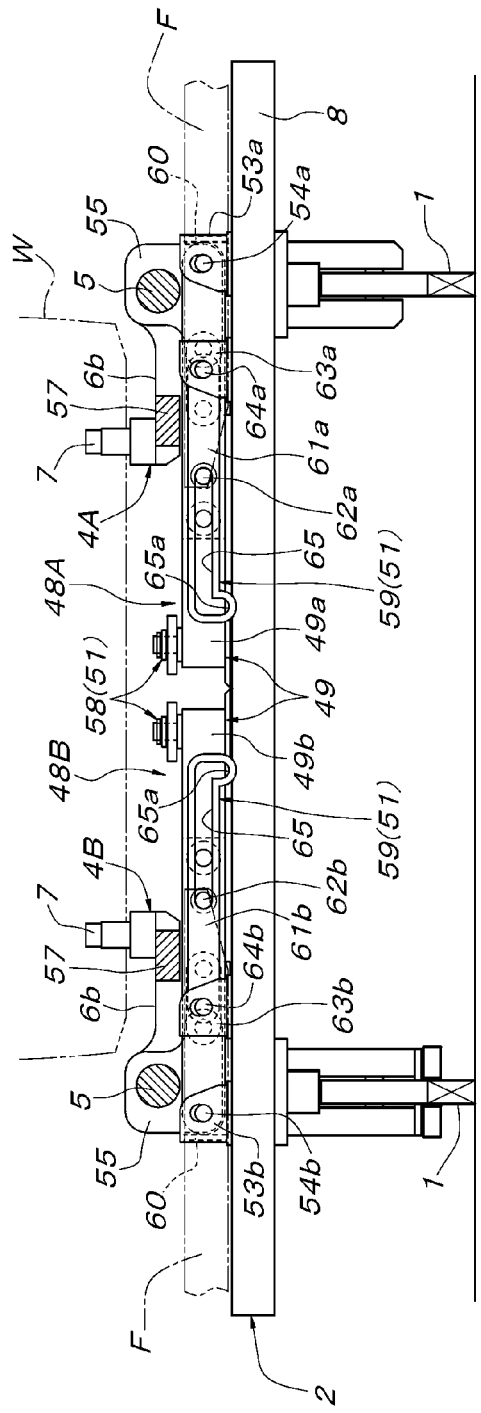
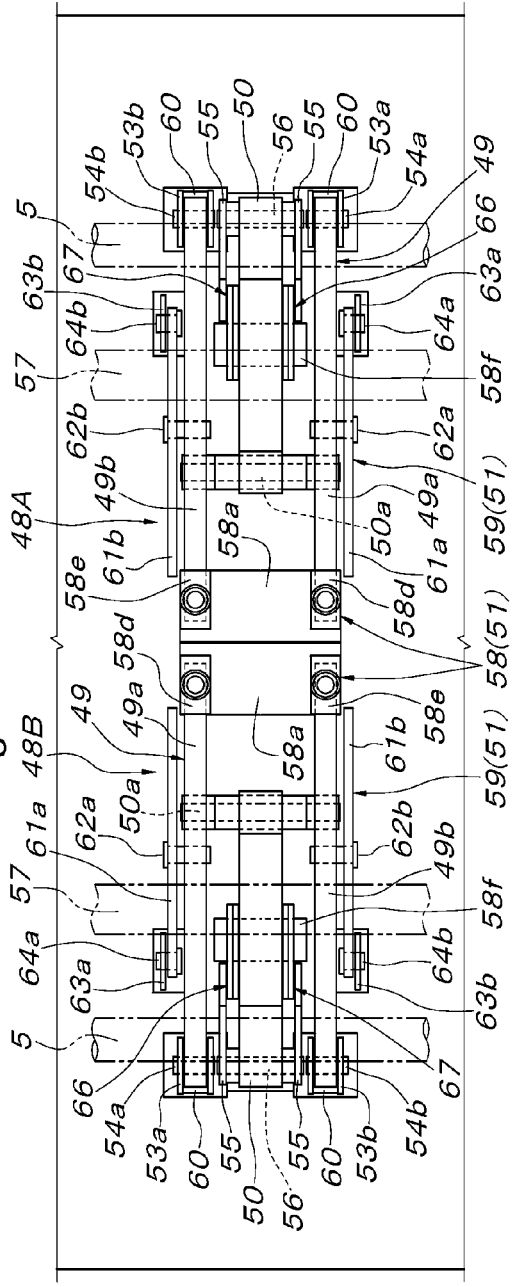
Fig. 19A
Fig. 19B

WORKPIECE ELEVATING SUPPORT DEVICE

CROSS-REFERENCE TO RELATED APPLICATIONS

The present application is a continuation of pending International patent application PCT/JP2010/068117 filed on Oct. 15, 2010 which designates the United States and claims priority from Japanese patent application 2009-241977 filed on Oct. 21, 2009, the content of which is incorporated herein by reference.

FIELD OF THE INVENTION

The present invention relates to a workpiece elevating support device which can be utilized in a carriage-type conveying apparatus for conveying an automobile body while changing the height thereof in each section in an automobile assembly line.

BACKGROUND OF THE INVENTION

When conveyed in the automobile assembly line, the automobile body needs to be supported at the lowest height of being close to a surface of a traveling carriage in working sections called a trim line and a final line. Further, the automobile body needs to be supported at a level high enough for a worker to enter under the automobile body in a working section called a chassis line. There have been known workpiece elevating support devices usable by being installed on the traveling carriage in such circumstances, in which a workpiece support is supported vertically movably by a pantograph mechanism as described in Patent Document 1, and in which a workpiece support is supported on a lateral portion of or immediately above an elevating body that vertically moves along a column erected on the traveling carriage although no patent document is disclosed.

PRIOR ART DOCUMENTS

Patent Documents

Patent Document 1: Japanese Published Unexamined Patent Application No. 62-218305.

SUMMARY OF THE INVENTION

In the workpiece elevating support device with the use of the pantograph mechanism as described in Patent Document 1, a means to vertically movably support a workpiece such as an automobile body, that is, a pantograph mechanism can be arranged within a space between the workpiece and the carriage. However, the maximum lifting height is small, and the device has difficulty in being utilized as a workpiece conveying apparatus in the chassis line. When the workpiece elevating support device is constituted by a lifter with the use of a column, the column needs to be arranged outside the workpiece. This results in narrowing a working space at the periphery of the workpiece supported. Moreover, when the workpiece elevating support device is constituted by a lifter with the use of a vertically expandable and contractible elevating body, the height of the workpiece elevating support device in a contracted state becomes relatively large if the maximum lifting height is attempted to be increased, and the workpiece elevating support device needs to be protruded under the traveling carriage if the entire workpiece elevating support device is attempted to be housed within a space below the workpiece (the automobile body). Consequently, a low-floor traveling carriage cannot be used.

Means for Solving the Problems

The present invention proposes a workpiece elevating support device which can solve the above-described conventional problems. A workpiece elevating support device according to the first aspect of the present invention, and described with reference symbols in parentheses used in the description of embodiments described below, includes at least two center-folding double link mechanisms (3A, 3B) arranged in parallel on a base (8), a workpiece support (4A, 4B), and a lock means (15), wherein the center-folding double link mechanisms (3A, 3B) are each composed of an intermediate link member (9), a lower parallel link (10) interposed between the intermediate link member (9) and the base (8), an upper link member (11) to which the workpiece support (4A, 4B) is consecutively provided, and an upper parallel link (12) interposed between the intermediate link member (9) and the upper link member (11), and the link mechanisms (3A, 3B) can rise and fall between a folded fallen-down posture of being folded and fallen down on the base (8) and an expanding-rising posture of vertically raising the workpiece support (4A, 4B) to a predetermined height, and the lock means (15) holds each of the center-folding double link mechanisms (3A, 3B) in the expanding-rising posture.

When the afore-described present invention is carried out, it can be configured such that the workpiece support (4A, 4B) is projected inward from the upper link member (11) of each of the center-folding double link mechanisms (3A, 3B) in the expanding-rising posture toward the other center-folding double link mechanism (3B, 3A), and each of the center-folding double link mechanisms (3A, 3B) is folded down inward toward the other center-folding double link mechanism (3B, 3A) from the expanding-rising posture.

The lock means (15) can be composed of a first lock means (13) to control an angle between the lower parallel link (10) and upper parallel link (12) of each of the center-folding double link mechanisms (3A, 3B) and a second lock means (14) to control an angle between the lower parallel link (10) of each of the center-folding double link mechanisms (3A, 3B) and the base (8). Further, the expanding-rising posture of the two parallel center-folding double link mechanisms (3A, 3B) held by the lock means (15) can be such a center-bulging symmetry that positions of the intermediate link members (9) protrude outward, or conversely can be such a center-constricted symmetry that positions of the intermediate link members (9) protrude inward.

The upper link members (11) of the center-folding double link mechanisms (3A, 3B) can be connected and integrated by a connecting member (28). Further, there can also be provided a drive means (30) to make each of the center-folding double link mechanisms (3A, 3B) rise and fall between the folded fallen-down posture and the expanding-rising posture. Still further, the center-folding double link mechanisms (3A, 3B) each can be configured to have the lower parallel link (10) and the upper parallel link (12) positioned in the same horizontal plane while taking the folded fallen-down posture.

When the workpiece elevating support device of the present invention is used by being installed on a carriage (2) which travels on a constant traveling path, the carriage (2) can be provided with an elevating body (34) making each of the center-folding double link mechanisms (3A, 3B) rise and fall between the folded fallen-down posture and an intermediate expanding-rising posture lower than the expanding-rising posture, and a cam rail (35*a*, 35*b*) elevating the elevating body (34) along with traveling of the carriage (2) can be laid on the traveling path of the carriage (2).

A workpiece elevating support device according to the second aspect of the present invention includes at least two center-folding double link mechanisms (48A, 48B) arranged in parallel on a base (8), a workpiece support (4A, 4B), a lock means (51), and a workpiece support lock means (52), wherein the center-folding double link mechanisms (48A, 48B) are each composed of a lower link (49) having a lower end pivotally supported on the base (8) and an upper link (50) having a lower end pivotally supported to the lower link (49) and an upper end to which the workpiece support (4A, 4B) is vertically swingably supported, and the link mechanisms (48A, 48B) can rise and fall between a folded fallen-down posture of being folded and fallen down on the base (8) and an expanding-rising posture of vertically raising the workpiece support (4A, 4B) to a predetermined height, the lock means (51) holds each of the center-folding double link mechanisms (48A, 48B) in the expanding-rising posture, and the workpiece support lock means (52) holds the workpiece support (4A, 4B) in a horizontal posture with respect to each of the center-folding double link mechanisms (48A, 48B) in the expanding-rising posture.

A workpiece elevating support device according to the third aspect of the present invention includes at least two center-folding double link mechanisms (48A, 48B) arranged in parallel on a base (8), a workpiece support (78), and a lock means (15), wherein the center-folding double link mechanisms (48A, 48B) are each composed of a lower link (49) having a lower end pivotally supported on the base (8) and an upper link (50) having a lower end pivotally supported to the lower link (49) and an upper end connected with that of the other center-folding double link mechanism (48B, 48A) by the workpiece support (78), and the link mechanisms (48A, 48B) can rise and fall between a folded fallen-down posture of being folded and fallen down on the base (8) and an expanding-rising posture of vertically raising the workpiece support (78) to a predetermined height, and the lock means (15) holds each of the center-folding double link mechanisms (48A, 48B) in the expanding-rising posture.

When the second or third aspect of the present invention is carried out, it can be configured such that the workpiece support (4A, 4B, 78) is projected inward from each of the center-folding double link mechanisms (48A, 48B) in the expanding-rising posture toward the other center-folding double link mechanism (48B, 48A), and each of the center-folding double link mechanisms (48A, 48B) is folded down inward toward the other center-folding double link mechanism (48B, 48A) from the expanding-rising posture. Further, the lock means (15) can be composed of a first lock means (58) to control an angle between the lower link (49) and upper link (50) of each of the center-folding double link mechanisms (48A, 48B) and a second lock means (59) to control an angle between the lower link (49) of each of the center-folding double link mechanisms (48A, 48B) and the base (8). Still further, the center-folding double link mechanisms (48A, 48B) each can be configured to have the lower link (49) and the upper link (50) positioned in the same horizontal plane while taking the folded fallen-down posture.

When the workpiece elevating support device according to the second or third aspect of the present invention is used by being installed on a carriage (2) which travels on a constant traveling path, the carriage (2) can be provided with an elevating body (71) elevating the workpiece support (4A, 4B, 78) between an intermediate height at a time when the center-folding double link mechanisms (48A, 48B) are in an intermediate expanding-rising posture lower than the expanding-rising posture and a lowered position at a time when the center-folding double link mechanisms (48A, 48B) are in the folded fallen-down posture, and a cam rail (76*a*, 76*b*) elevating the elevating body (71) along with traveling of the carriage (2) can be laid on the traveling path of the carriage (2).

Furthermore, when any of the afore-described aspects of the present invention are carried out, a pair of left and right workpiece supports (4A, 4B) long in a front-rear direction can be provided so as to support a front and rear of both lateral surfaces of a workpiece (W) at both ends thereof, and the center-folding double link mechanisms (3A, 3B, 48A, 48B) can be configured to support longitudinal intermediate positions of the workpiece supports (4A, 4B). Further, four workpiece supports (79*a* to 79*d*) respectively supporting a front and rear of both lateral surfaces of a workpiece (W) and four center-folding double link mechanisms (80*a* to 80*d*) respectively supporting the workpiece supports (79*a* to 79*d*) can be provided, and the center-folding double link mechanisms (80*a* to 80*d*) can be arranged such that longitudinal directions of the links thereof in the folded fallen-down posture become oblique and radial but not parallel to one another in a plan view.

Effects of the Invention

According to the configuration of the first aspect of the present invention, a workpiece such as an automobile body is supported by two workpiece supports having been supported by two center-folding double link mechanisms in the folded fallen-down posture, whereby the two workpiece supports (respective upper link members of the center-folding double link mechanisms) are integrally connected via the workpiece. Thus, the two workpiece supports (respective upper link members of the center-folding double link mechanisms) are vertically lifted up by a lifter or respective lower parallel links of the center-folding double link mechanisms are pushed upward by the drive means, whereby the workpiece supported on the workpiece supports can be vertically and parallelly raised along with expanding and rising of the two center-folding double link mechanisms. Once the workpiece is raised to a predetermined height, the lock means is operated to hold the two center-folding double link mechanisms in the expanding-rising posture having a predetermined angle. As a result, the workpiece can be supported stably at a predetermined height by the at least two center-folding double link mechanisms held in the expanding-rising posture.

More specifically, the workpiece is supported at the lowest position when the center-folding double link mechanisms are in the folded fallen-down posture, whereas the workpiece is supported at the highest position when the center-folding double link mechanisms are in the expanding-rising posture. Therefore, the center-folding double link mechanisms are switched between the folded fallen-down posture and the expanding-rising posture, whereby the height of their supporting workpiece can be switched between the lowest position and the highest position. Furthermore, if the lower parallel link and the upper parallel link are configured to expand substantially vertically collinearly when the center-folding double link mechanisms take the expanding-rising posture, the workpiece supports can be supported at relatively very high positions with respect to the lowest positions thereof when the center-folding double link mechanisms are in the folded fallen-down posture. Further, the center-folding double link mechanisms expanding substantially vertically linearly under the workpiece merely stand upright when the workpiece is supported at the highest position, so that a large working space can be ensured under the workpiece.

Accordingly, the workpiece elevating support device of the present invention is used by being installed on a traveling carriage for conveying an automobile body in an automobile assembly line, whereby the automobile body can be supported at heights suitable for respective working sections called a trim line and a final line where the automobile body needs to be supported at the lowest height of being close to a surface of the traveling carriage and a chassis line where the automobile body needs to be supported at a level high enough for a worker to enter under the automobile body, by holding the center-folding double link mechanisms in the folded fallen-down posture in the trim line and the final line and by switching the center-folding double link mechanisms to the expanding-rising posture in the chassis line. Furthermore, a large working space can be ensured under the automobile body supported at the highest position, and accordingly, workability cannot be reduced. Further, the problems arising when the workpiece elevating support device is constituted by a lifter with the use of a column or a lifter with the use of a vertically expandable and contractible elevating body can all be solved.

According to the second aspect of the present invention and the third aspect of the present invention, the same effects as the first aspect of the present invention can be obtained, although on the condition that a lifter which supports and vertically elevates the workpiece support is used together.

Especially according to the configuration, the center-folding double link mechanisms in the folded fallen-down posture can be housed between the workpiece supported at the lowest position and the surface of the base (the traveling carriage), so that a large working space can be ensured at the periphery of the workpiece and workability can be improved compared with the case where a support means greatly projects outside the workpiece.

According to the configuration, the configuration of the lock means to hold the center-folding double link mechanisms in the expanding-rising posture is simplified, whereby the present invention can be carried out easily. Although the center-folding double link mechanisms can be held also in an expanding-rising posture of rising perfectly vertically linearly with respect to the base, the center-folding double link mechanisms in the expanding-rising posture can be held easily and stably according to the configuration, and the load applied to the lock means can be reduced. Further, according to the configuration, stability of the entire workpiece elevating support device having supported the workpiece at the highest position is increased, and the load applied to the lock means can be reduced. Further, the need to support the workpiece supports individually is eliminated also when elevated by a lifter, so that the elevation of the workpiece support by the lifter is facilitated. In addition, given that the workpiece supports are connected and integrated by their supporting workpiece or the configuration, the combined use of the lifter which supports and elevates the workpiece support becomes unnecessary according to the configuration.

According to the configuration, the volume of the center-folding double link mechanisms in the folded fallen-down posture which support the workpiece at the lowest position can be reduced considerably, and the height on the base of the workpiece supported at the lowest position can be sufficiently lowered.

In addition, according to the configuration, it becomes possible to support the workpiece at an intermediate height position between the lowest position of being supported by the center-folding double link mechanisms in the folded fallen-down posture and the highest position of being supported by the center-folding double link mechanisms in the expanding-rising posture. Furthermore, a special power source is not required in the carriage in order to elevate the workpiece between the intermediate height position and the lowest position. Thus, the present invention can be carried out easily and inexpensively.

According to the configuration, the front and rear of both lateral surfaces of the workpiece, that is, four places in total can be supported by a pair of left and right center-folding double link mechanisms. Further, according to the configuration, the front and rear of both lateral surfaces of the workpiece, that is, four places in total are respectively supported by the center-folding double link mechanisms. Accordingly, even if large and heavy, the workpiece can be supported safely and stably. Furthermore, the center-folding double link mechanisms become resistant to lateral swinging, whereupon stability and safety can be enhanced, compared with the case where longitudinal directions of the links thereof in the folded fallen-down posture are arranged to be parallel to one another. Especially when the workpiece elevating support device is installed on the traveling carriage, the workpiece can be conveyed safely with shaking thereof suppressed even when supported at the highest position and conveyed.

BRIEF DESCRIPTION OF THE DRAWINGS

FIG. 1A is a front view showing a state where a workpiece is supported at the lowest position and FIG. 1B is a front view showing a state where the workpiece is supported at the highest position;

FIG. 6A is an exploded front view showing a part of components of the center-folding double link mechanism, FIG. 6B is a front view showing a variation of a component of FIG. 6A, and FIG. 6C is an exploded side view showing the entire components of the center-folding double link mechanism;

FIG. 13A is a front view in which a right half shows a state where a workpiece support is pushed up to an intermediate height and a left half shows a state where the workpiece support is lowered to the lowest position and FIG. 13B is an enlarged view of a main part;

FIGS. 14A and 14B show the fourth variation of the embodiment of the first aspect, and FIG. 14A is a front view showing a state where a workpiece is supported at the highest position and an enlarged view of a part thereof and FIG. 14B is a front view of a center-folding double link mechanism on one side showing a state immediately before the workpiece is supported at the highest position and an enlarged view of a part thereof;

FIG. 15A is a side view showing a center-folding double link mechanism on one side and FIG. 15B is a front view thereof;

FIG. 19A is a partially cutaway front view showing a state where center-folding double link mechanisms are in a folded fallen-down posture in the above embodiment and FIG. 19B is a plan view of a main part thereof;

DETAILED DESCRIPTION OF THE INVENTION

Figure 1A:
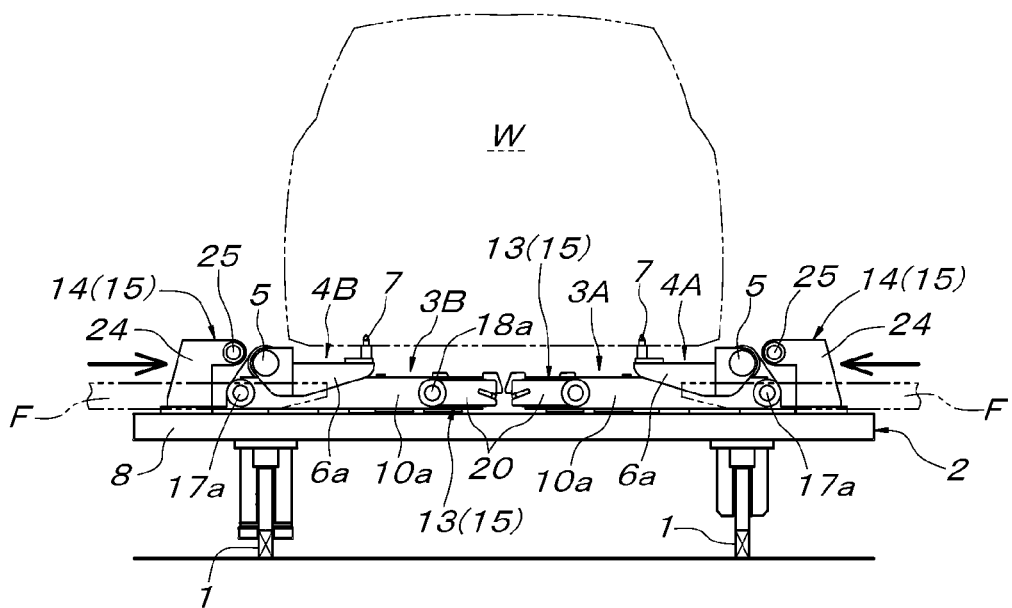
FIGS. 1A and 1B show an embodiment of the first aspect of the present invention.

First, an embodiment of the first aspect of the present invention will be described based on FIGS. 1A to 10. In this embodiment, a workpiece elevating support device of the present invention is arranged on a traveling carriage 2 supported and traveling on guide rails 1. Taking a traveling direction of the traveling carriage 2 as a front-rear direction, the workpiece elevating support device on the traveling carriage 2 is composed of a pair of left and right center-folding double link mechanisms 3A and 3B and a pair of left and right workpiece supports 4A and 4B respectively supported by the center-folding double link mechanisms 3A and 3B. The workpiece supports 4A and 4B are bilaterally symmetrical and are each composed of a rod member 5 being long in the front-rear direction, arms 6a and 6b inwardly projected from front and rear ends of the rod member 5, and workpiece support tools 7 provided on respective upper sides of distal ends of the arms 6a and 6b. The rod member 5 has a substantially central part in a longitudinal direction thereof supported by the center-folding double link mechanism 3A or 3B. It is noted that the paired left and right center-folding double link mechanisms 3A and 3B are arranged immediately below respective longitudinal centers of lateral surfaces of a workpiece W such as an automobile body whose front and rear of the lateral surfaces are supported by the paired left and right workpiece supports 4A and 4B.

The center-folding double link mechanisms 3A and 3B are bilaterally symmetrical and are each composed of a lower parallel link pair 10 interposed between an intermediate link member 9 and a base 8 which is a carriage main body of the traveling carriage 2, and an upper parallel link pair 12 interposed between the intermediate link member 9 and an upper link member 11. The center-folding double link mechanisms 3A and 3B are each juxtaposed with a lock means 15 composed of a first lock means 13 to control an angle between the lower parallel link pair 10 and the upper parallel link pair 12 and a second lock means 14 to control an angle between the lower parallel link pair 10 and the base 8.

Hereinafter, a detailed description is given. As shown in FIGS. 5A to 6C, the lower parallel link pair 10 is composed of two links 10a and 10b. The links 10a and 10b have one ends laterally swingably supported by longitudinal and horizontal spindles 17a and 17b on bearings 16a and 16b fixed on the base 8 as displaced longitudinally and laterally. The upper parallel link pair 12 is composed of two links 12a and 12b arranged in such a manner as to sandwich the intermediate link member 9. One end of one of the links 12a, a free end of one of the links 10a of the lower parallel link pair 10, and one end of the intermediate link member 9 arranged laterally and horizontally are swingably supported and connected by a common longitudinal and horizontal spindle 18a. At the same time, one end of the other link 12b, a free end of the other link 10b of the lower parallel link pair 10, and the other end of the intermediate link member 9 are swingably supported and connected by a common longitudinal and horizontal spindle 18b. The upper link member 11 of the center-folding double link mechanism 3A or 3B is fixed at a substantially central part in the longitudinal direction of the rod member 5 of the workpiece support 4A or 4B and includes bearing portions 11a and 11b below the rod member 5 at bilaterally symmetrical positions with respect to the rod member 5. The other ends of the links 12a and 12b of the upper parallel link pair 12 are swingably supported and connected by respective longitudinal and horizontal spindles 19a and 19b on the bearing portions 11a and 11b of the upper link member 11.

As configured above, each center-folding double link mechanism 3A or 3B has the paired spindles 17a and 17b on the base 8 side and the paired spindles 18a and 18b on the intermediate link member 9 side positioned at respective vertices of a parallelogram and also has the paired spindles 18a and 18b on the intermediate link member 9 side and the paired spindles 19a and 19b on the workpiece support 4A or 4B side positioned at respective vertices of another parallelogram, when viewed from the front. In a side view, the links 12a and 12b of the upper parallel link pair 12 are located in parallel while adjoining both outer sides of the intermediate link member 9, and the links 10a and 10b of the lower parallel link pair 10 are located in parallel while adjoining both outer sides of the links 12a and 12b.

The lock means 15 juxtaposed to each center-folding double link mechanism 3A or 3B will be described. The first lock means 13 constituting this lock means 15 is composed of a locked member 20 having a distal end cut into a recessed portion 20a, and a locking piece 21 detachable from the recessed portion 20a. The locked member 20 is formed of a strip plate fixedly projected in an extending direction of the link 10a of the lower parallel link pair 10 from the end on the intermediate link member 9 side of the link 10a. The locking piece 21 is supported on the link 12a of the upper parallel link pair 12 by a spindle 22 orthogonal to the longitudinal direction of the link 12a and parallel to a plate surface of the locked member 20. The second lock means 14 constituting the lock means 15 is composed of a locked hole 23 provided in the vicinity of the lower end of the link 10a of the lower parallel link pair 10 so as to penetrate longitudinally and horizontally and a lock pin 25 supported fittably and detachably with respect to the locked hole 23 by a support member 24 mounted on the base 8.

Additionally, each center-folding double link mechanism 3A or 3B is juxtaposed with stoppers 26 and 27 which limit an expansion angle of the upper parallel link pair 12 with respect to the lower parallel link pair 10. The stopper 26 is composed of a stopper member 26a fixed on a lateral surface of the link 10a and a stopper member 26b fixed on a peripheral surface of the end on the intermediate link member 9 side of the link 12a. Abutment of both stopper members 26a and 26b limits an expansion angle between the link 10a of the lower parallel link pair 10 and the link 12a of the upper parallel link pair 12. The stopper 27 is composed of a stopper member 27a fixed on a lateral surface of the link 10b and a stopper member 27b fixed on a peripheral surface of the end on the intermediate link member 9 side of the link 12b. Abutment of both stopper members 27a and 27b limits an expansion angle between the link 10b of the lower parallel link pair 10 and the link 12b of the upper parallel link pair 12. It is a matter of course that the expansion angle between the links 10a and 12a and expansion angle between the links 10b and 12b limited by the stoppers 26 and 27 are identical. Further, either one of the stoppers 26 and 27 may only be employed.

Figure 7:
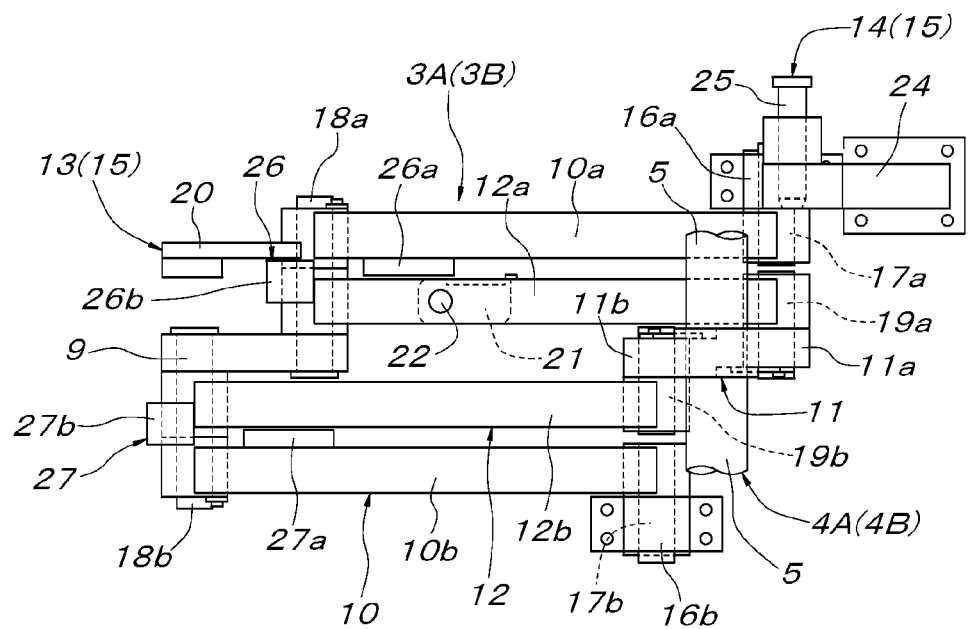
FIG. 7 is a plan view showing the center-folding double link mechanism on one side in a folded fallen-down posture.

In the workpiece elevating support device as configured above, both center-folding double link mechanisms 3A and 3B can be folded down toward inner sides of getting close to each other, as shown in FIG. 1A and FIG. 7. More specifically, the lower parallel link pairs 10 are rotated inward about the spindles 17a and 17b and the upper parallel link pairs 12 are reversely rotated outward about the spindles 18a and 18b, whereupon both links 12a and 12b of the upper parallel link pairs 12 are fitted between both links 10a and 10b of the lower parallel link pairs 10. These links 10a, 10b, 12a, and 12b, the intermediate link members 9, and the bearing portions 11a and 11b of the upper link members 11 are all fallen down and supported on the surface of the base 8 while laterally and horizontally oriented. More specifically, the links 10a, 10b, 12a, and 12b, the intermediate link members 9, and the bearing portions 11a and 11b of the upper link members 11 are all overlaid longitudinally at the same height. All of the spindles 17a to 19b are positioned in the same horizontal plane. Only the rod members 5 of the workpiece supports 4A and 4B fixed to the upper link members 11 are superposed on the upper sides of the center-folding double link mechanisms 3A and 3B in the folded fallen-down posture. Since a center distance between both ends of the links 10a and 10b of the lower parallel link pairs 10 and a center distance between both ends of the links 12a and 12b of the upper parallel link pairs 12 are equal, the spindles 17a and 19b are placed in series concentrically and so are the spindles 17b and 19b as shown in FIG. 7 when the center-folding double link mechanisms 3A and 3B take the folded fallen-down posture.

When both center-folding double link mechanisms 3A and 3B take the folded fallen-down posture as described above, inner ends thereof, that is, bent portions between the lower parallel link pairs 10 and the upper parallel link pairs 12 adjoin each other at a substantially central position in a width direction of the base 8. As a matter of course, before the center-folding double link mechanisms 3A and 3B are brought into the folded fallen-down posture as described above, the locking pieces 21 of the first lock means 13 of the lock means 15 are rotated in a direction parallel to the links 12b, separated from the recessed portions 20a of the locked members 20, and switched to a non-locking posture which does not obstruct the folding action of the center-folding double link mechanisms 3A and 3B. Further, the lock pins 25 of the second lock means 14 of the lock means 15 are switched to non-locking positions of being separated from the locked holes 23 of the links 10a.

Figure 8:
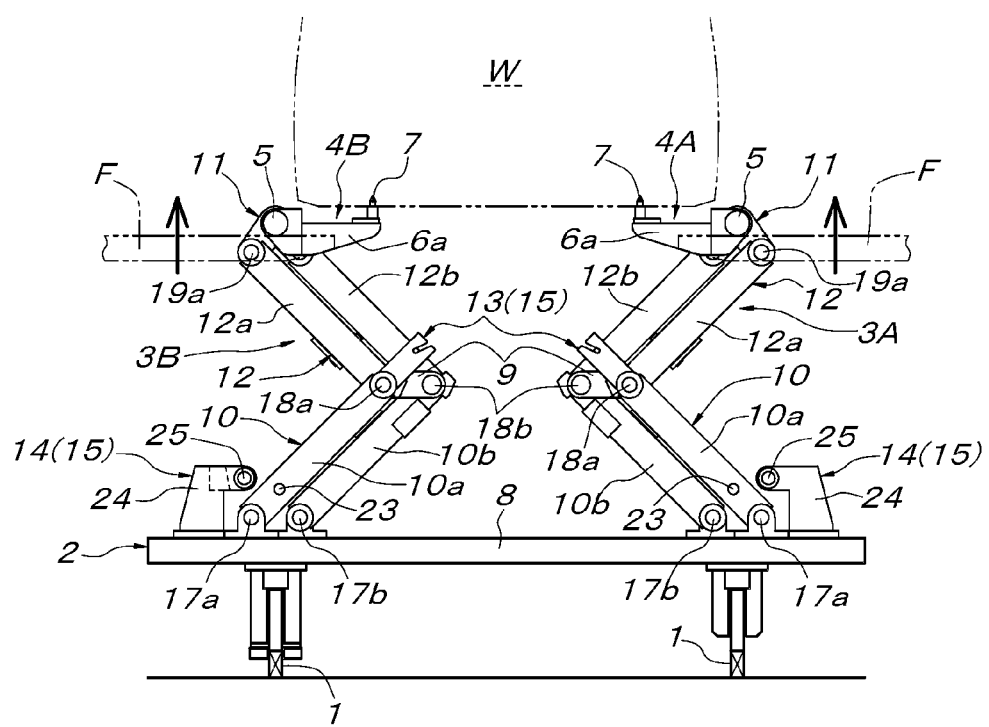
FIG. 8 is a front view showing an intermediate first stage from the state shown in FIG. 1A to the state shown in FIG. 1B.

The workpiece supports 4A and 4B are located at the lowest positions of being closest to the base 8 when both center-folding double link mechanisms 3A and 3B are in the folded fallen-down posture. Thus, the workpiece W is transferred onto the workpiece supports 4A and 4B by an appropriate means, thereupon making the front and rear of both lateral surfaces of the workpiece W be supported by the workpiece support tools 7 of the workpiece supports 4A and 4B. After that, forks F of a lifter are horizontally inserted from both lateral sides of the base 8, into between the rod members 5 of the workpiece supports 4A and 4B at the lowest positions and the base 8, preferably at the front and rear of the center-folding double link mechanisms 3A and 3B. Once inserted to a predetermined depth, the forks F are raised to lift up the paired left and right workpiece supports 4A and 4B vertically via the rod members 5. Along with the vertical parallel ascent of the workpiece supports 4A and 4B at this moment, as shown in FIG. 8, the lower parallel link pairs 10 of the center-folding double link mechanisms 3A and 3B rise and rotate outward about the spindles 17a and 17b, and also the upper parallel link pairs 12 rise and rotate inward about the spindles 18a and 18b, whereupon the center-folding double link mechanisms 3A and 3B expand and rise from the folded fallen-down posture.

Figure 9:
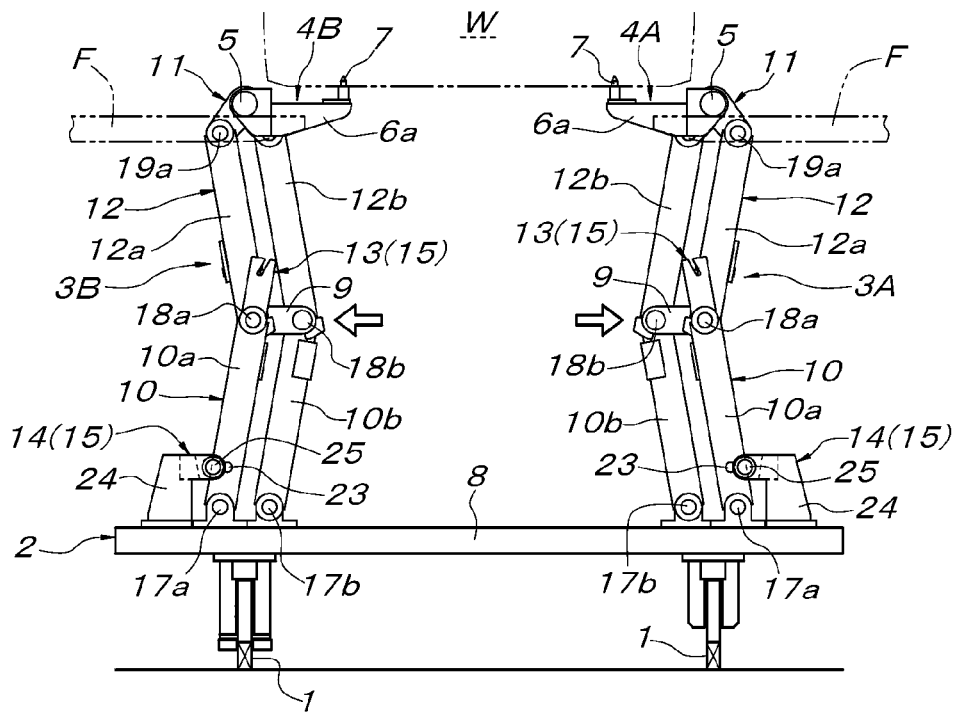
FIG. 9 is a front view showing an intermediate second stage of the same.
Figure 10:
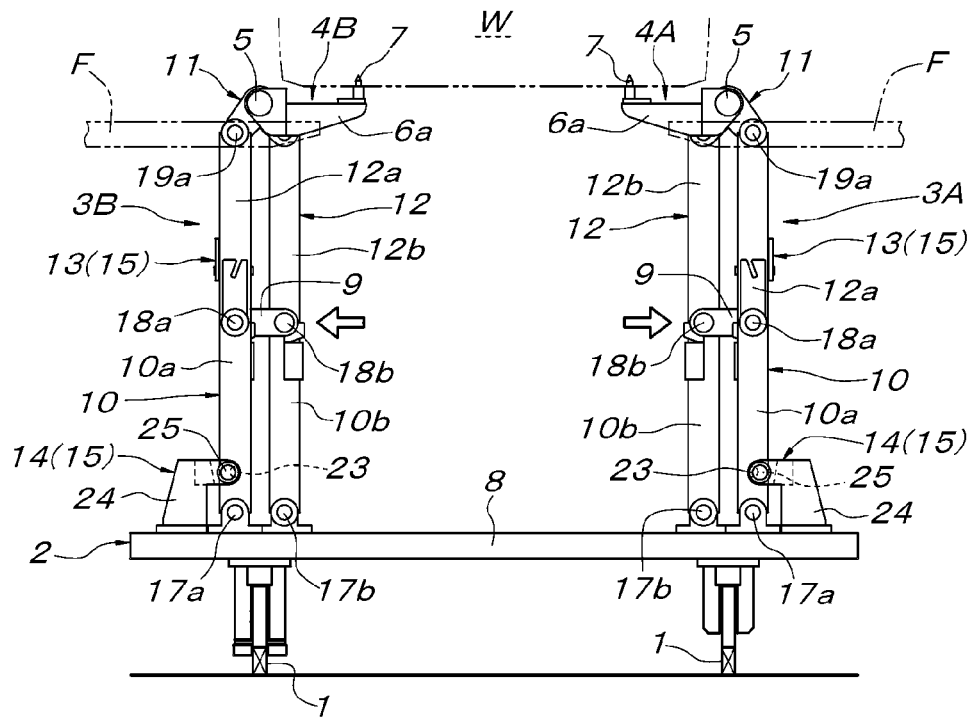
FIG. 10 is a front view showing an intermediate third stage of the same.

The lift-up of the workpiece supports 4A and 4B by the forks F are stopped at the point when both center-folding double link mechanisms 3A and 3B assume such a center-constricted symmetry that positions of the intermediate link members 9 slightly protrude inward, just before becoming vertically linear, as shown in FIG. 9. Appropriate positions between upper and lower ends of the center-folding double link mechanisms 3A and 3B are pressed outward by, for example, a pusher (a puller tool) provided to the lifter equipped with the forks F. As a result, both center-folding double link mechanisms 3A and 3B assume such a center-bulging symmetry that the positions of the intermediate link members 9 slightly protrude outward, via a completely rising posture of being vertically linear as shown in FIG. 10. Then, the rod members 5 of the workpiece supports 4A and 4B are again supported by the forks F. By a slight descent of the forks F at this moment or afterwards, both center-folding double link mechanisms 3A and 3B take a desired final expanding-rising posture as shown in FIG. 1B, and further outward bendings thereof are prevented by the abutments between the stopper members 26a and 26b and between the stopper members 27a and 27b of the stoppers 26 and 27.

If the elevation of the forks F can be performed accurately or when such a mechanism is combined that absorbs an upward lifting force upon the workpiece supports 4A and 4B exerted by the forks F while the center-folding double link mechanisms 3A and 3B are in the completely rising posture of being vertically linear as shown in FIG. 10, the shaft holes of the bearings 16a and 16b are rendered vertically long and both center-folding double link mechanisms 3A and 3B are configured to be able to be pulled slightly upward, for example. In that instance, the workpiece supports 4A and 4B are lifted up by the forks F until the center-folding double link mechanisms 3A and 3B take the completely rising posture of being vertically linear as shown in FIG. 10 and then stopped, instead of being stopped in the state shown in FIG. 9. After that, the forks F are lowered while the appropriate positions between the upper and lower ends of the center-folding double link mechanisms 3A and 3B are pressed outward by the pusher (the puller tool) as described above, thereby allowing both center-folding double link mechanisms 3A and 3B to reach the desired final expanding-rising posture as shown in FIG. 1B.

Figure 1B:
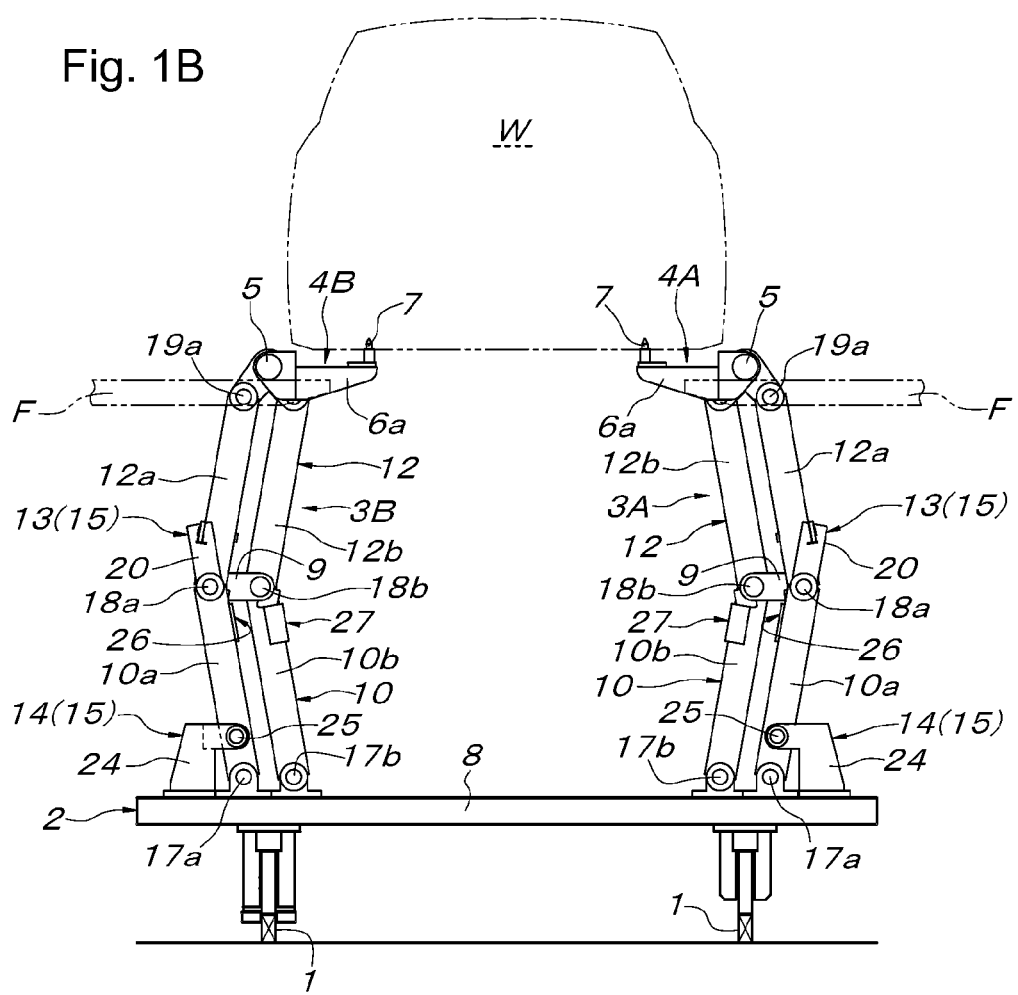
Figure 2:
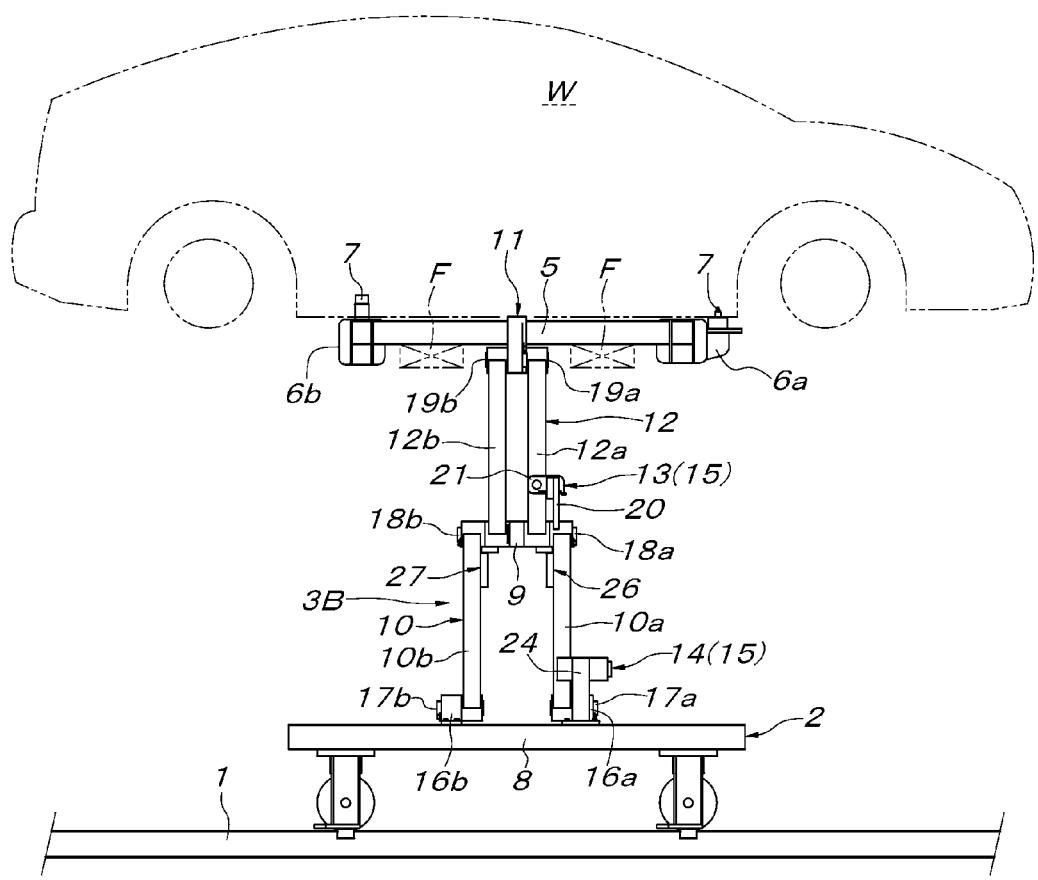
FIG. 2 is a left side view of FIG. 1B.
Figure 3:
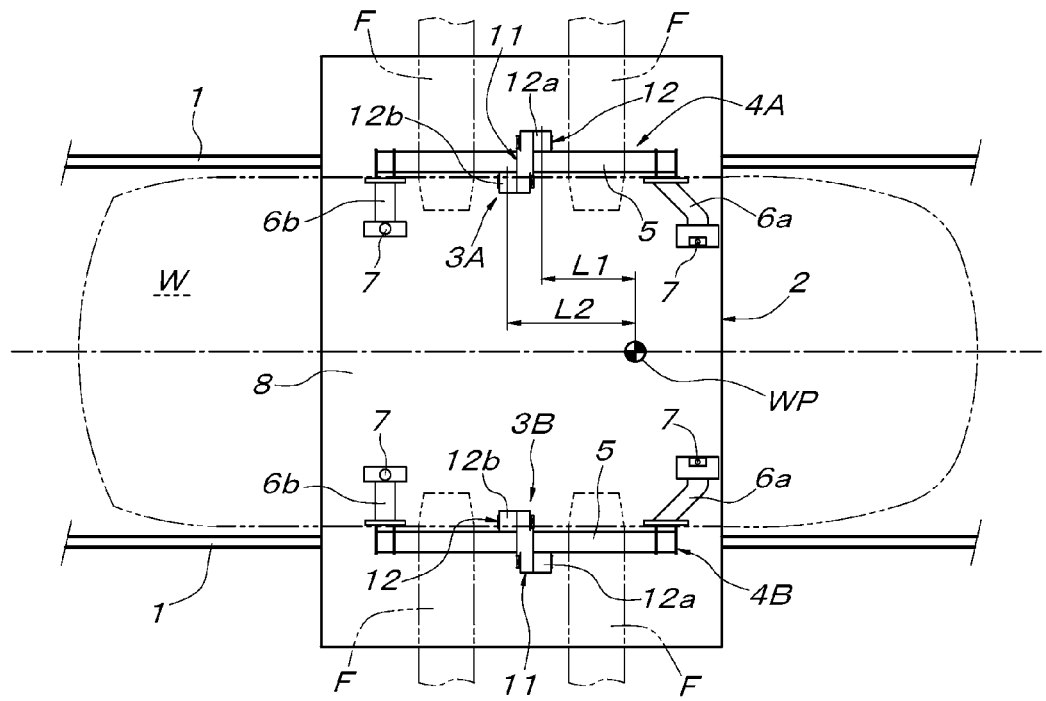
FIG. 3 is a plan view of an upper end of the workpiece elevating support device in the state of FIG. 1B.
Figure 4:
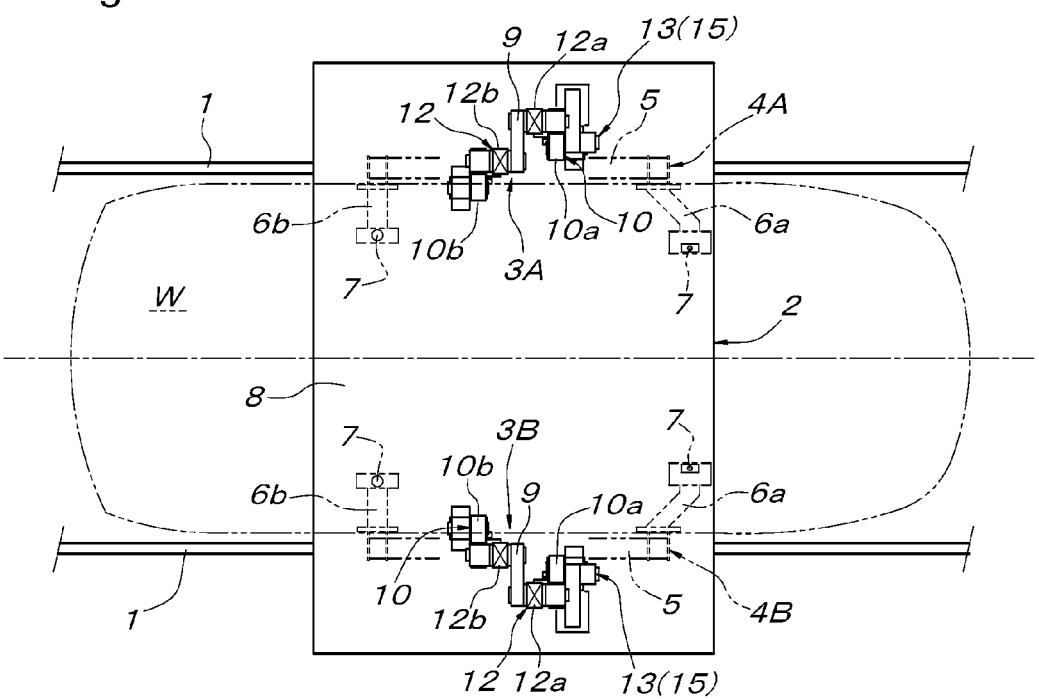
FIG. 4 is a cross sectional plan view showing a lower half of the workpiece elevating support device in the state of FIG. 1B.
Figure 5A:
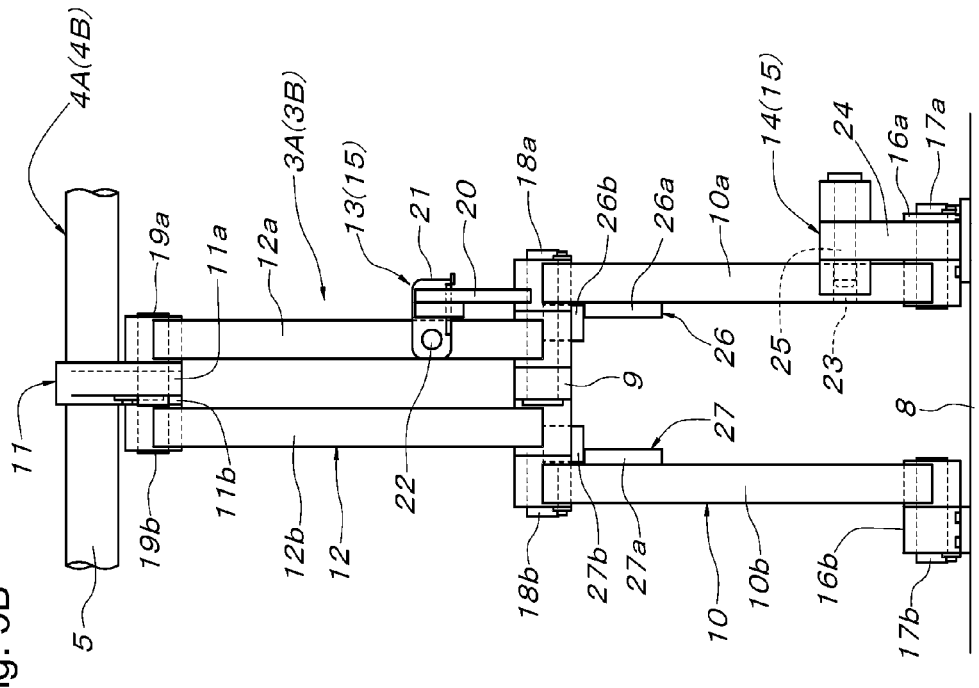
FIG. 5A is a rear view showing a center-folding double link mechanism on one side and FIG. 5B is a side view thereof.
Figure 5B:
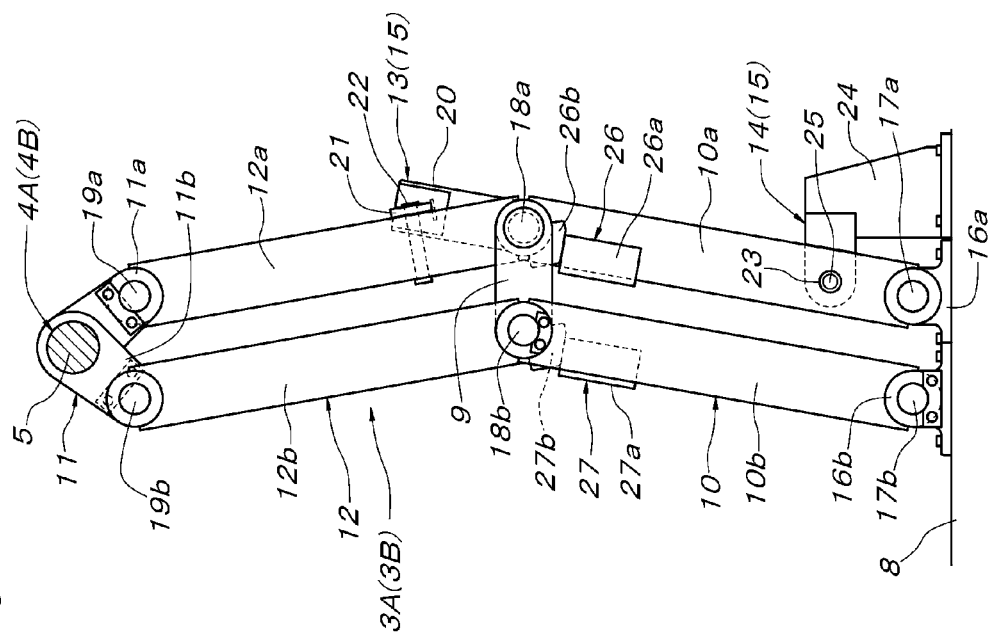

Once both center-folding double link mechanisms 3A and 3B are checked in the desired final expanding-rising posture as shown in FIG. 1B by the stoppers 26 and 27, the locking pieces 21 of the first lock means 13 of the lock means 15 on the links 12a are rotated downward about the spindles 22 and fitted into the recessed portions 20a of the locked members 20 on the links 10a, and also the lock pins 25 of the second lock means 14 are advanced and inserted into the locked holes 23 of the links 10a. In other words, the first and second lock means 13 and 14 of the lock means 15 are configured such that the locking pieces 21 can be fitted into the recessed portions 20a of the locked members 20 and also the lock pins 25 can be inserted into the locked holes 23 only when both center-folding double link mechanisms 3A and 3B are checked in the desired final expanding-rising posture as shown in FIG. 1B by the stoppers 26 and 27.

The first and second lock means 13 and 14 of the lock means 15 are operated in the above manner, whereupon the angles between the lower parallel link pairs 10 and the upper parallel links pair 12 of the center-folding double link mechanisms 3A and 3B are fixed by the first lock means 13 and the angles between the lower parallel link pairs 10 and the base are fixed by the second lock means 14, and both center-folding double link mechanisms 3A and 3B are fixed on the base 8 in the desired final expanding-rising posture of being the center-bulging symmetry that the positions of the intermediate link members 9 protrude slightly outward. Thus, the forks F can be lowered and pulled out.

Since further outward bendings of the center-folding double link mechanisms 3A and 3B are prevented by the stoppers 26 and 27 when the center-folding double link mechanisms 3A and 3B are in the desired final expanding-rising posture, it is sufficient that the first lock means 13 prevents the center-folding double link mechanisms 3A and 3B from expanding toward the completely rising posture of being vertically linear as shown in FIG. 10. Accordingly, as shown in FIG. 6B, the locked member 20 of the first lock means 13 has only to include a contact surface 20b abutting against a lateral surface of the locking piece 21 and preventing the center-folding double link mechanism 3A or 3B from expanding toward the completely rising posture of being vertically linear as shown in FIG. 10. That is, a part of the first lock means 13 of the lock means 15 can be constituted by the stoppers 26 and 27.

It is noted that the locking piece 21 of the first lock means 13 is configured so as to be switchable against a spring force between a locking posture of being engaged with the recessed portion 20a (or the contact surface 20b) of the locked member 20 and a non-locking posture of being separated from the recessed portion 20a (or the contact surface 20b) in an alternative way, whereby the locking piece 21 can be switched between the locking posture and the non-locking posture by a switching means of the lifter equipped with the forks F. However, an appropriate actuator for switching the locking piece 21 between the locking posture and the non-locking posture such as a solenoid, a motor, or a cylinder can be incorporated into the first lock means 13, as well. Similarly, the lock pin 25 of the second lock means 14 is configured so as to be switchable against a spring force between a locking position of being fitted to the locked hole 23 of the link 10a and a non-locking position of being separated from the locked hole 23 in an alternative way, whereby the lock pin 25 can be switched between the locking position and the non-locking position by the switching means of the lifter equipped with the forks F. However, an appropriate actuator for switching the lock pin 25 between the locking position and the non-locking position such as a solenoid, a motor, or a cylinder can be incorporated into the second lock means 14, as well.

If the workpiece supports 4A and 4B supported by both center-folding double link mechanisms 3A and 3B are completely connected to each other at the same level by their supporting workpiece W or connected and integrated with each other by connecting members as described below, the lower parallel link pairs 10 of the center-folding double link mechanisms 3A and 3B are fixed on the base 8 by the second lock means 14 when the center-folding double link mechanisms 3A and 3B take the final expanding-rising posture by means of the forks F. Then, the center-folding double link mechanisms 3A and 3B can be held in the final expanding-rising posture. Thus, with this configuration, the lock means 15 can also be constituted by the second lock means 14 only.

To lower the workpiece supports 4A and 4B supporting the workpiece W at the highest positions to the initial lowest positions, an operation reverse to the operation of raising the workpiece supports 4A and 4B supporting the workpiece W at the lowest positions to the highest positions has only to be performed. More specifically, the forks F of the lifter are inserted under the rod members 5 of the workpiece supports 4A and 4B and are raised. The locking action of the first lock means 13 and second lock means 14 of the lock means 15 is released in a state where the workpiece supports 4A and 4B are supported by the forks F via the rod members 5. More specifically, the locking pieces 21 of the first lock means 13 are switched to the non-locking posture and separated upward from the recessed portions 20a (the contact surfaces 20b) of the locked members 20, and the lock pins 25 of the second lock means 14 are retreated to the non-locking positions and separated from the locked holes 23. As a result, the center-folding double link mechanisms 3A and 3B become free to bend. Thus, the appropriate positions between the upper and lower ends of the center-folding double link mechanisms 3A and 3B are pressed inward from outward by the pusher or the like provided to the lifter equipped with the forks F. The center-folding double link mechanisms 3A and 3B are switched to the center-constricted symmetry that the positions of the intermediate link members 9 protrude slightly inward as shown in FIG. 9, through the completely rising posture of being vertically linear as shown in FIG. 10. The rod members 5 of the workpiece supports 4A and 4B are supported by the forks F again. The forks F supporting the workpiece supports 4A and 4B are lowered in this state, whereby the workpiece supports 4A and 4B are vertically and parallelly lowered and reach the lowest positions with the center-folding double link mechanisms 3A and 3B bending from the expanding-rising posture of being the center-constricted symmetry to the folded fallen-down posture of being supported on the surface of the base 8, as shown in FIG. 1A. After that, the forks F are withdrawn to both outer sides, whereupon the operation of lowering the workpiece supports 4A and 4B (the workpiece W) to the lowest positions is completed.

Used as a means to convey an automobile body in the automobile assembly line, the traveling carriage 2 installed with the workpiece elevating support device capable of vertically and parallelly elevating its supporting workpiece W between the lowest position and the highest position by means of the forks F of the external lifter as described above can support the workpiece (the automobile body) W at the lowest position of being lowered near to the surface of the traveling carriage 2 in the trim line and the final line being set in the automobile assembly line and can support the workpiece (the automobile body) W at a height enough for a worker to enter thereunder, that is, in a state where the workpiece (the automobile body) W is raised to the highest position, in the chassis line. When the traveling carriage 2 installed with the workpiece elevating support device of the present invention is used in this manner, the lifter provided with the forks F, the pusher, and a means to operate the lock means 15 are juxtaposed on the path aside of a switching point from the trim line to the chassis line or a switching point from the chassis line to the final line.

It is noted that the configuration of the lock means 15 holding the center-folding double link mechanisms 3A and 3B in the final expanding-rising posture is not restricted to the afore-described embodiment. When the first lock means 13 is in a working condition, the center-folding double link mechanisms 3A and 3B merely correspond to parallel links respectively which cannot be folded at the center, in the afore-described embodiment. Thus, the paired left and right center-folding double link mechanisms 3A and 3B supporting the workpiece W in the final expanding-rising posture parallelly swing laterally with respect to the base 8 and the workpiece W cannot be supported at a predetermined position, even if the workpiece supports 4A and 4B supported by the center-folding double link mechanisms 3A and 3B are connected and integrated with each other by the workpiece W or connecting members as described below. Consequently, the lock means 15 in the above embodiment is configured such that the lower parallel link pair 10 (at least one of the links 10a and 10b) of at least one of the paired left and right center-folding double link mechanisms 3A and 3B is fixed at a constant angle with respect to the base 8 by the second lock means 14. However, the lock means has only to be able to prevent the bending of the center-folding double link mechanisms 3A and 3B supporting the workpiece W in the final expanding-rising posture and the swinging thereof with respect to the base 8. Thus, the lock means can also be constituted by the first lock means 13 to prevent the parallel swinging of the upper parallel link pair 12 with respect to the lower parallel link pair 10 and a lock means to prevent parallel swinging of at least one of the lower parallel link pair 10 and the upper parallel link pair 12 such as a means to join at least one of the links 10a, 10b, 12a, and 12b and the intermediate link member 9 or upper link member 11 or a means to join the parallel links 10a and 10b or links 12a and 12b together. Further, the lock means can also be constituted by a means to join one of the links 10a and 10b of the lower parallel link pair 10 and one of the links 12a and 12b of the upper parallel link pair 12 to the intermediate link member 9 instead of combining the afore-described first lock means 13.

Figure 25:
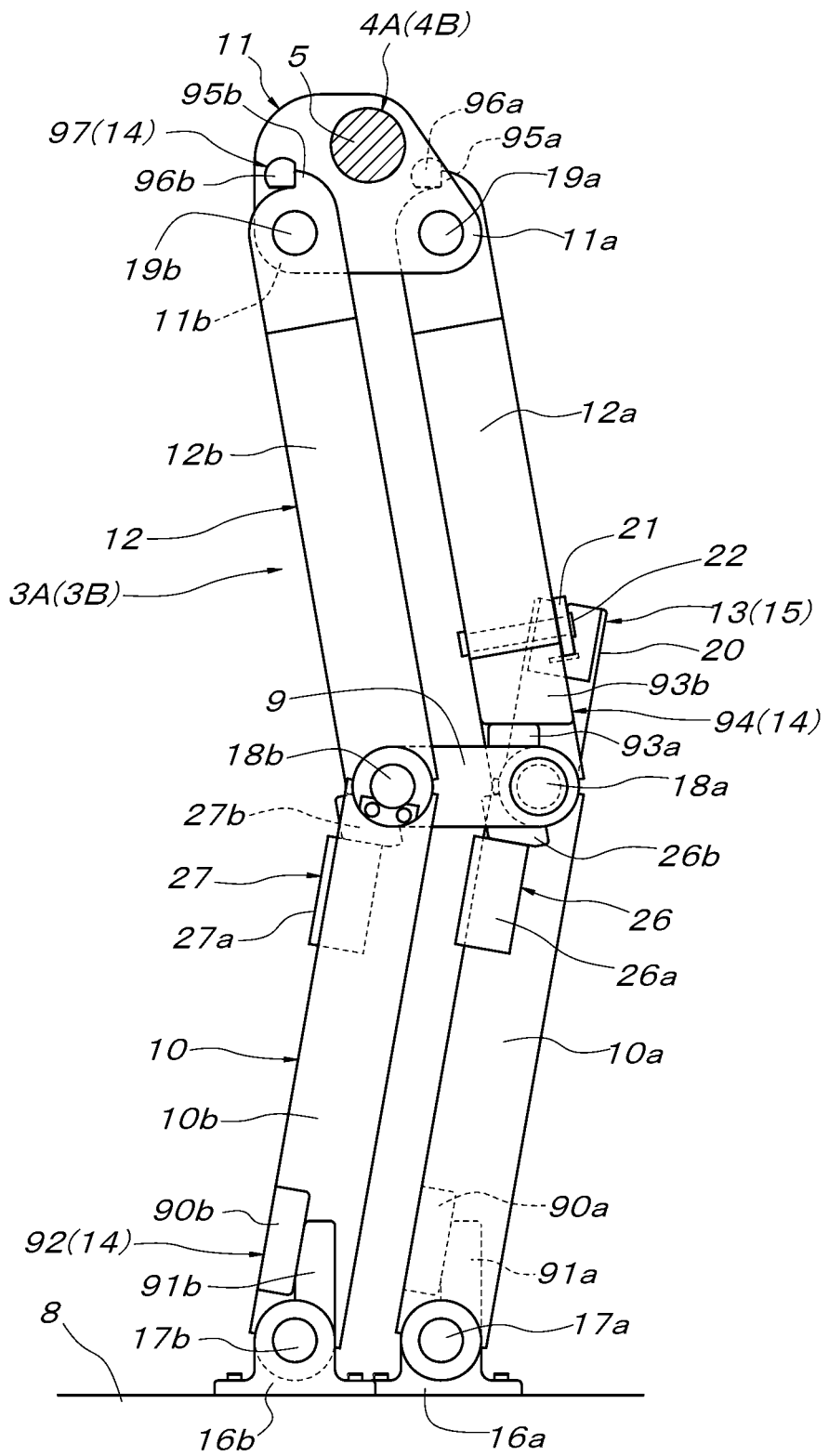
FIG. 25 is a rear view of a center-folding double link mechanism on one side showing the sixth variation of the embodiment of the first aspect.

Additionally, another specific embodiment of the second lock means 14 constituting the lock means 15 will be described based on FIG. 25. The second lock means 14 shown in FIG. 25 is constituted by a first stopper 92 composed of contact members 90a and 90b fixed on lateral surfaces in the vicinities of the ends on the base 8 side of the links 10a and 10b of the lower parallel link pair 10 and stopper members 91a and 91b fixedly projected from the bearings 16a and 16b supporting the links 10a and 10b to the base 8, a second stopper 94 composed of a contact member 93a fixed on a top surface of one end of the intermediate link member 9 and a stopper member 93b fixed on a lateral surface in the vicinity of the end on the intermediate link member 9 side of one of the links 12a of the upper parallel link pair 12, and a third stopper 97 composed of contact members 95a and 95b projected from peripheral surfaces of the ends on the upper link member 11 side of the links 12a and 12b of the upper parallel link pair 12 and stopper members 96a and 96b projectingly fixed with lateral surfaces of the bearing portions 11a and 11b of the upper link member 11.

The above stoppers 92, 94, and 97 are respectively configured such that the contact members 90a, 90b, 93a, 95a, and 95b respectively abut against the counterpart stopper members 91a, 91b, 93b, 96a, and 96b when the center-folding double link mechanisms 3A and 3B take the final expanding-rising posture as shown and the lower parallel link pairs 10 and the upper parallel link pairs 12 are locked with each other at predetermined angles by the first lock means 13. According to this configuration, the entire center-folding double link mechanisms 3A and 3B with the lower parallel link pairs 10 and the upper parallel link pairs 12 locked with each other at predetermined angles by the first lock means 13 can be prevented from parallelly swinging outward (the direction in which the center-folding double link mechanisms 3A and 3B are separated from each other) from the final expanding-rising posture as shown by the first stoppers 92 and be prevented from parallelly swinging inward reversely by the second and third stoppers 94 and 97. Consequently, no movable member (lock pin 25) which needs to be operated is required, so that the structure and control system can be simplified to cut down costs. As a matter of course, the first stopper 92 may only be configured to be able to prevent either one of the links 10a and 10b from swinging outward, and only either one of the second and third stoppers 94 and 97 may be provided. When the third stopper 97 is employed, only either one of the links 12a and 12b may be configured to be restricted in swinging with respect to the upper link member 11. Furthermore, the second stopper 94 can be configured between the link 12b and the intermediate link member 9 as well although an illustration thereof is omitted.

According to the paired left and right center-folding double link mechanisms 3A and 3B as configured above, the links 10a and 12a positioned outside when the paired link mechanisms 3A and 3B are viewed from the front are located rearwardly away by a longitudinal distance L1 from a forwardly-located barycentric position WP of the workpiece (the automobile body) W supported at a fixed position by the paired left and right workpiece supports 4A and 4B, whereas the inner links 10b and 12b of the paired link mechanisms 3A and 3B are located rearwardly away by a longitudinal distance L2 (L2>L1) from the barycentric position WP and away from the barycentric position WP more rearward than the outside links 10a and 12a.

While these paired left and right center-folding double link mechanisms 3A and 3B are in the final expanding-rising posture and support the workpiece W via the workpiece supports 4A and 4B, a tensile force acts upon the outer links 10a and 12a and a compressive force acts upon the inner links 10b and 12b. Thus, the outer links 10a and 12a subjected to the tensile force are arranged nearer to the barycentric position WP of the workpiece W, and the inner links 10b and 12b subjected to the compressive force are arranged away from the barycentric position WP of the workpiece W, whereby the tensile force and the compressive force acting upon the links 10a, 10b, 12a, and 12b can be reduced.

In the drawings, the traveling carriage 2 is shown as traveling along the longitudinal direction (the front-rear direction) of the workpiece (the automobile body) W whose both lateral surfaces are supported by the workpiece supports 4A and 4B. However, the traveling carriage 2 may travel along the width direction of the workpiece (the automobile body) W whose both lateral surfaces are supported by the workpiece supports 4A and 4B. Traveling the traveling carriage 2 in such a direction is more convenient for working in the chassis line.

In the trim line and the final line, on the other hand, traveling the traveling carriage 2 in the longitudinal direction (the front-rear direction) of the workpiece (the automobile body) W whose both lateral surfaces are supported by the workpiece supports 4A and 4B is more convenient for working. Therefore, the traveling carriage 2 is preferably such that the traveling direction thereof can be switched between the longitudinal direction and the width direction.

Figure 11:
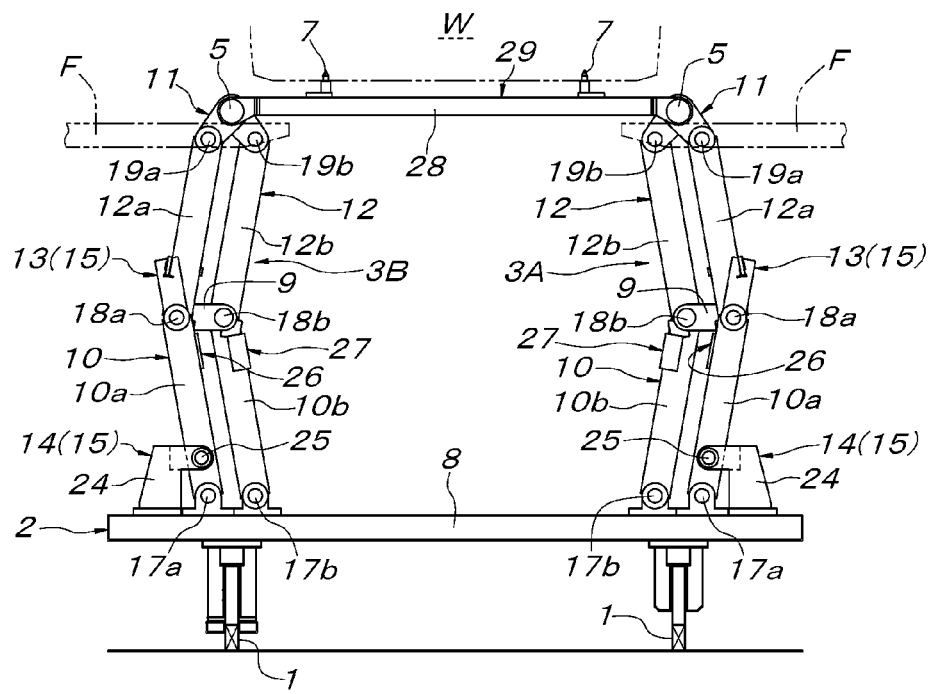
FIG. 11 is a front view showing the first variation of the embodiment of the first aspect.

Further, the upper link members 11 of the center-folding double link mechanisms 3A and 3B can be connected and integrated with each other by connecting members 28 as shown in FIG. 11. More specifically, front ends and rear ends of the rod members 5 respectively fixed with the upper link members 11 of the center-folding double link mechanisms 3A and 3B are connected to each other by the connecting members 28, thereby constituting a single piece of workpiece support 29 having a rectangular frame shape in plan. Workpiece support tools 7 can be projected at four places, the front, rear, left, and right of the workpiece support 29.

Figure 12:
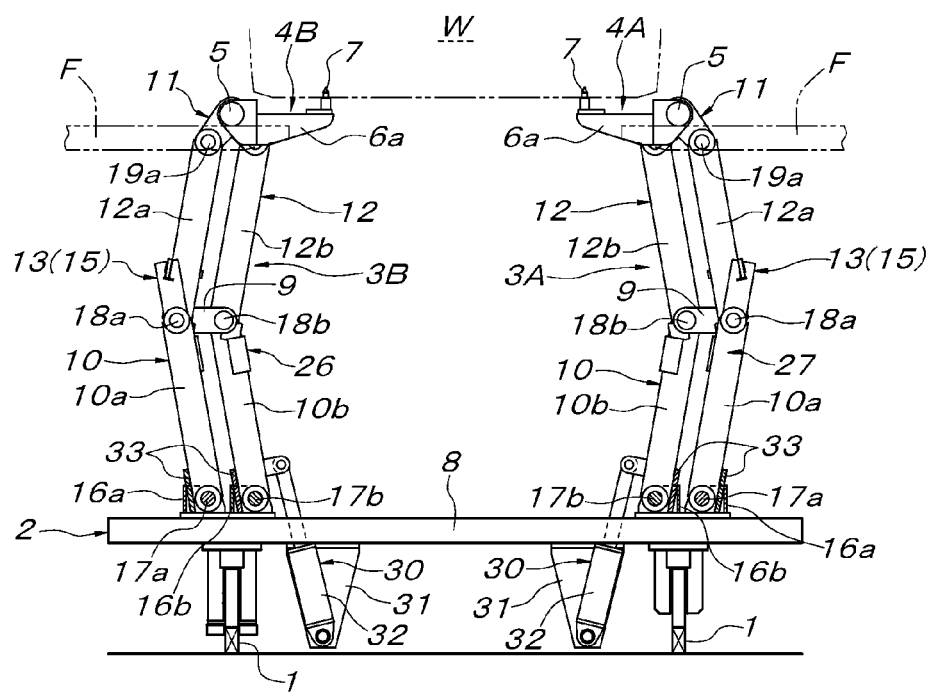
FIG. 12 is a front view of the second variation of the embodiment of the first aspect.

Additionally, a drive means 30 to make each center-folding double link mechanisms 3A or 3B rise and fall between the folded fallen-down posture and the expanding-rising posture can be provided between the center-folding double link mechanism 3A or 3B and the base 8, as shown in FIG. 12. The drive means 30 can be provided with a cylinder unit 32 which connects a bracket 31 projected under the base 8 of the traveling carriage 2 with the inner link 10b of the lower parallel link pair 10 of each center-folding double link mechanism 3A or 3B and penetrates the base 8 vertically, as shown. If the drive means 30 are used together, the lifter equipped with the forks F does not have to be used together. Particularly when the drive means 30 configured to be capable of holding the center-folding double link mechanism 3A or 3B in the final expanding-rising posture, for example, an electric drive means in which a worm gear is interposed with a transmission system, is provided, the drive means 30 can be used as the second lock means 14 of the lock means 15, so that the above-described second lock means 14 can be eliminated. If the above cylinder unit 32 is used, the center-folding double link mechanism 3A or 3B is configured to have reached its final expanding-rising posture when the cylinder unit 32 is extended to an extension limit, or stoppers 33 which limit the expanding bending movement of the center-folding double link mechanism 3A or 3B up to the final expanding-rising posture are juxtaposed to, for example, the bearings 16a and 16b supporting respective links 10a and 10b of the lower parallel link pair 10 on the base 8, whereupon the center-folding double link mechanism 3A or 3B can be biasingly held in the final expanding-rising posture by the stoppers 33 and the biasing force of the cylinder unit 32.

When the above drive means 30 are used together, the upper link members 11 of the upper parallel link pairs 12 (the workpiece supports 4A and 4B) cannot be elevated vertically and parallelly when the lower parallel link pairs 10 are made to rise and fall by the drive means 30, unless the paired left and right workpiece supports 4A and 4B supported by respective center-folding double link mechanisms 3A and 3B are completely connected to each other at the same level by their supporting workpiece W. Thus, it is preferable to combine the configuration as shown in FIG. 11 when the above drive means 30 are used together. Furthermore, the drive means 30 capable of holding the center-folding double link mechanism 3A or 3B in the final expanding-rising posture and the configuration as shown in FIG. 11 are used in combination, whereby the drive means 30 alone can also serve as the lock means 15. As a result, the above-described first lock means 13 and second lock means 14 can be eliminated.

Figure 13A:
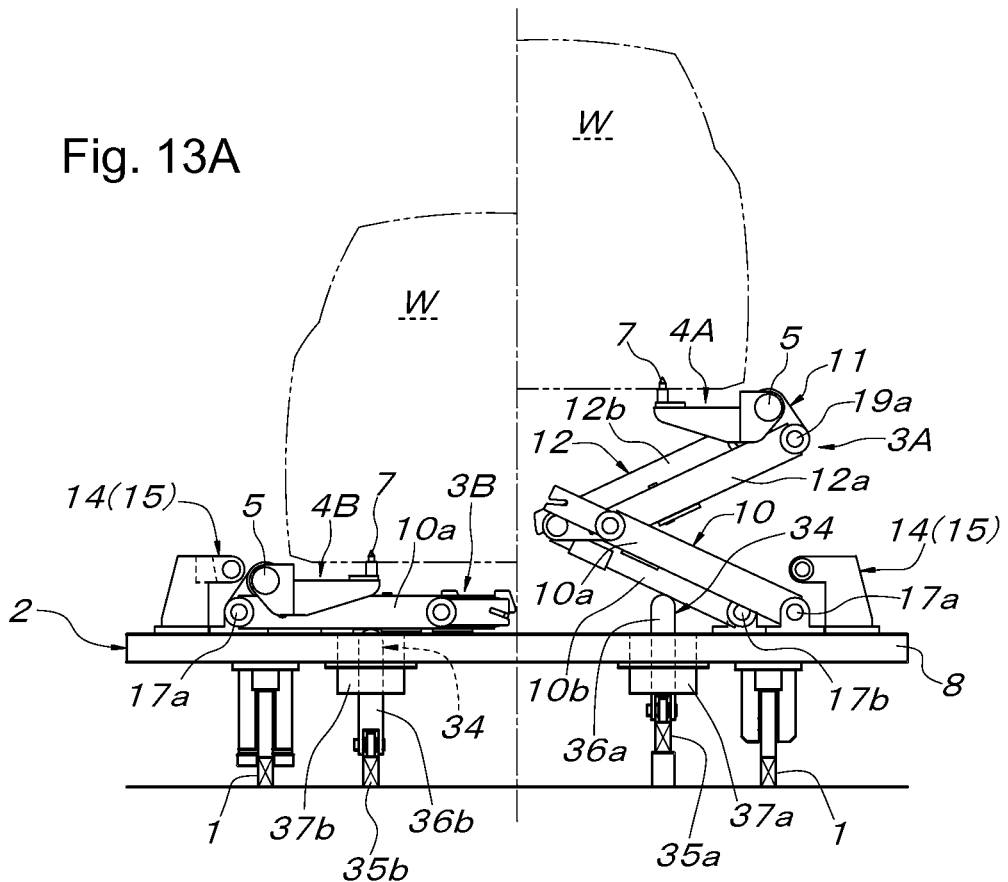
FIGS. 13A and 13B show the third variation of the embodiment of the first aspect.
Figure 13B:
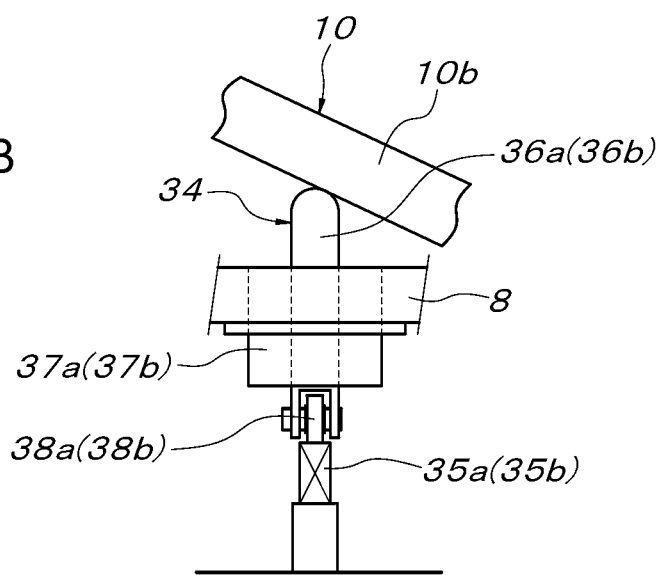

In an embodiment as shown in FIG. 13, there are provided elevating bodies 34 which make respective center-folding double link mechanisms 3A and 3B rise and fall between an intermediate expanding-rising posture (shown in the right half of FIG. 13) lower than the expanding-rising posture and the folded fallen-down posture (shown in the left half of FIG. 13). Cam rails 35a and 35b elevating the elevating bodies 34 along with traveling of the traveling carriage 2 are laid on a carriage traveling path. The elevating bodies 34 respectively use elevating rods 36a and 36b individually thrusting up the inner links 10b of the lower parallel link pairs 10 of the center-folding double link mechanisms 3A and 3B. Elevation guides 37a and 37b for only vertically movably guiding the elevating rods 36a and 36b are provided to the base 8. The elevating rods 36a and 36b have lower ends at which cam follower rollers 38a and 38b rolling on the cam rails 35a and 35b are respectively pivotally supported.

According to this configuration, although on the condition that the paired left and right workpiece supports 4A and 4B supported by the center-folding double link mechanisms 3A and 3B are completely connected to each other at the same level by their supporting workpiece W or connected and integrated by the configuration as shown in FIG. 11, the elevating rods 36a and 36b are pushed up by the cam rails 35a and 35b when the traveling carriage 2 travels a section where the cam rails 35a and 35b are laid within a section where the traveling carriage 2 travels with the workpiece supports 4A and 4B supported at the lowest positions (corresponding to the trim line and final line in the automobile assembly line). The pushed-up elevating rods 36a and 36b thrust up the inner links 10b of the lower parallel link pairs 10 of the center-folding double link mechanisms 3A and 3B by the same height. The center-folding double link mechanisms 3A and 3B are expanded to the intermediate expanding-rising posture (shown in the right half of FIG. 13) lower than the final expanding-rising posture. Accordingly, the workpiece W supported by the workpiece supports 4A and 4B can be conveyed while raised to an intermediate position from the lowest position, in the section where the cam rails 35a and 35b are laid.

It is noted that the configuration of the elevating bodies 34 should not be restricted to the one as shown in FIG. 13. For example, an elevating base supported by a pantograph mechanism and vertically moving with respect to the base 8 can be provided in order to render the amount of thrusting up the center-folding double link mechanisms 3A and 3B greater than the pushing-up height of the cam rails 35a and 35b, as described in Japanese Published Unexamined Patent Application No. 2009-51290. To this elevating base, thrust-up portions individually thrusting up the inner links 10b of the lower parallel link pairs 10 of the center-folding double link mechanisms 3A and 3B can be protrudingly provided. To one of the cross links constituting the above pantograph mechanism, a pushed-up operated portion provided with a cam follower roller at the lower end thereof can be provided.

In an embodiment as shown in FIG. 14, the final expanding-rising posture of the paired left and right center-folding double link mechanisms 3A and 3B, that is, the posture of the paired link mechanisms 3A and 3B at the time of being locked by the lock means 15 is configured to be such a center-constricted symmetry that positions of the intermediate link members 9 protrude inward. In this configuration, the locked member 20 of the first lock means 13 is provided with a contact surface 20b as shown in FIG. 6B. The stoppers 26 and 27 are configured to abut against each other when the center-folding double link mechanisms 3A and 3B exceed the final expanding-rising posture as shown in FIG. 14A and slightly expand toward a vertical linear position as shown in FIG. 14B, thereby being able to prevent further expansion.

According to this embodiment, when being lifted up by the forks F, the workpiece supports 4A and 4B at the lowest positions supported by the center-folding double link mechanisms 3A and 3B in the folded fallen-down posture are raised vertically and parallelly until the stoppers 26 and 27 abut against each other as shown in FIG. 14B and further expansion of the center-folding double link mechanisms 3A and 3B is prevented. In this state, the locking pieces 21 of the first lock means 13 of the lock means 15 are switched into the locking active posture, and the forks F are lowered. Then, although on the condition that the paired left and right workpiece supports 4A and 4B are completely connected to each other at the same level by their supporting workpiece W or connected and integrated by the configuration as shown in FIG. 11, the workpiece supports 4A and 4B descend slightly parallelly as the center-folding double link mechanisms 3A and 3B are bent inward by loads. The locking pieces 21 abut against the contact surfaces 20b of the locked members 20, whereupon the center-folding double link mechanisms 3A and 3B are prevented from being further bent. At this moment, the lock pins 25 of the second lock means 14 of the lock means 15 are positioned substantially concentrically with the locked holes 23 of the links 10a. Thus, the lock pins 25 are switched to the locking active positions and then fitted into the locked holes 23 to fix the lower parallel link pairs 10 with respect to the base 8. It is noted that the stoppers 26 and 27 are not active in this state, as shown in FIG. 14A.

As operated above, the center-folding double link mechanisms 3A and 3B are switched into the final expanding-rising posture of being the center-constricted symmetry as shown in FIG. 14A, and also held in the final expanding-rising posture with respect to the base 8 by the first and second lock means 13 and 14 of the lock means 15. As a result, the workpiece W supported by the workpiece supports 4A and 4B can be supported at the highest position at a predetermined height. To lower the workpiece W to the initial lowest position, the lock pins 25 of the second lock means 14 are switched into the non-locking positions while the workpiece supports 4A and 4B are supported by the forks F. After that, the workpiece supports 4A and 4B are slightly lifted up by the forks F, and the center-folding double link mechanisms 3A and 3B are expanded to the state as shown in FIG. 14B in which the stoppers 26 and 27 abut against each other. In this state, the locking pieces 21 of the first lock means 13 are switched into the non-locking posture. Then the workpiece supports 4A and 4B have only to be lowered vertically and parallelly by the forks F, whereupon the center-folding double link mechanisms 3A and 3B are folded and fallen down and reach the final folded fallen-down posture.

Figures 15A, 15B:
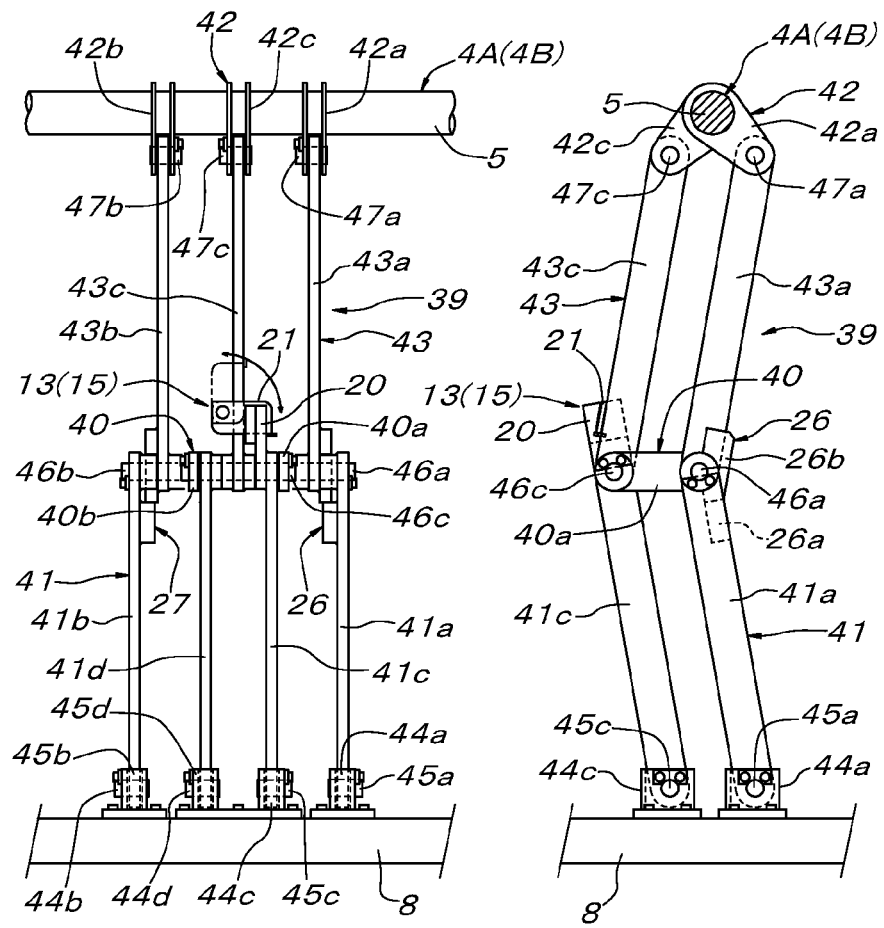
FIGS. 15A and 15B show the fifth variation of the embodiment of the first aspect.
Figure 16:
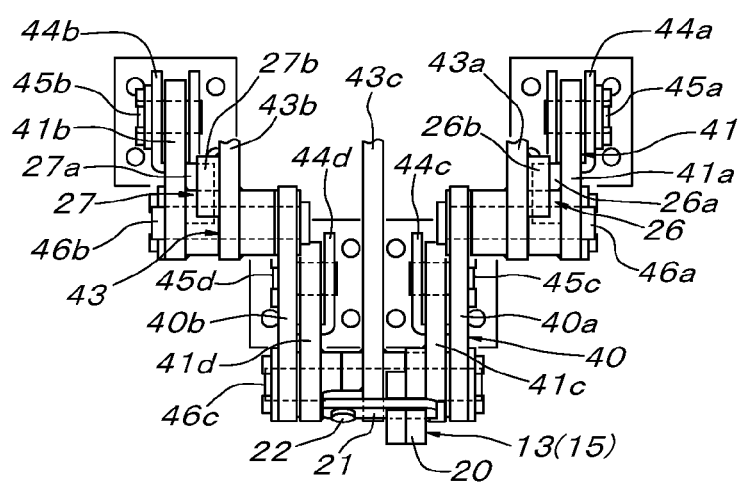
FIG. 16 is a plan view of the center-folding double link mechanism with an upper end thereof omitted.

FIGS. 15A to 16 show another embodiment of the center-folding double link mechanism. The center-folding double link mechanism 39 as shown represents one of a pair of left and right center-folding double link mechanisms supporting the workpiece supports 4A and 4B, at a time of taking the expanding-rising posture of being the center-bulging symmetry that positions of the intermediate link members protrude outward as shown in FIG. 1B. This center-folding double link mechanism 39 is composed of a lower parallel link group 41 interposed between the base 8 serving as the carriage main body of the traveling carriage 2 and an intermediate link member 40 and an upper parallel link group 43 interposed between the intermediate link member 40 and an upper link member 42.

The lower parallel link group 41 is composed of four links 41a to 41d. The two outer links 41a and 41b have one ends laterally swingably supported by mutually concentric, longitudinal, and horizontal spindles 45a and 45b to bearings 44a and 44b respectively fixed on the base 8 at a predetermined longitudinal interval. The two inner links 41c and 41d have one ends laterally swingably supported by mutually concentric, longitudinal, and horizontal spindles 45c and 45d to bearings 44c and 44d fixed away in laterally outward directions from the bearings 44a and 44b at a predetermined longitudinal interval. The intermediate link member 40 is composed of two horizontal links 40a and 40b.

The upper parallel link group 43 is composed of three links 43a to 43c. One link 43a of the two outer links 43a and 43c has one end positioned between a free end of one of the outer links 41a of the lower parallel link group 41 and one end of the horizontal link 40a of the intermediate link member 40 positioned inside the link 41a, which one end also relatively swingably supported and connected by a spindle 46a penetrating these ends in the longitudinal and horizontal direction. The other link 43b has one end positioned between a free end of the other outer link 41b of the lower parallel link group 41 and one end of the horizontal link 40b of the intermediate link member 40 positioned inside the link 41b, which one end also relatively swingably supported and connected by a spindle 46b penetrating these ends in the longitudinal and horizontal direction. Free ends of the two inner links 41c and 41d of the lower parallel link group 41 are positioned between free ends of the two horizontal links 40a and 40b of the intermediate link member 40 while holding one end of the central link 43c of the upper parallel link group 43 from both sides. The five links are relatively swingably supported and connected by a single spindle 46c penetrating in the longitudinal and horizontal direction.

The upper link member 42 is composed of three bearing members 42a to 42c fixed to a central area of the rod member 5 of each workpiece support 4A or 4B and extending obliquely downward. To the two outer bearing members 42a and 42b, free ends of the two outer links 43a and 43b of the upper parallel link group 43 are swingably supported by mutually concentric, longitudinal, and horizontal spindles 47a and 47b. To the central bearing member 42c, a free end of the central link 43c of the upper parallel link group 43 is swingably supported by a longitudinal and horizontal spindle 47c.

The above-configured center-folding double link mechanism 39 has the left and right spindles 45a (45b) and 45c (45d) on the base 8 side and the left and right spindles 46a (46b) and 46c on the intermediate link member 40 side positioned at respective vertices of a parallelogram and also has the left and right spindles 46a (46b) and 46c on the intermediate link member 40 side and the left and right spindles 47a (47b) and 47c on the workpiece support 4A or 4B side positioned at respective vertices of another parallelogram, when viewed from the front. In a side view, the four links 41a to 41d constituting the lower parallel link group 41 are located in parallel at substantially regular intervals, and the three links 43a to 43c constituting the upper parallel link group 43 are located in parallel at substantially regular intervals while positioned between respective links 41a to 41d of the lower parallel link group 41. It is noted that a first lock means 13 of a lock means 15 having the same structure as the earlier embodiment is arranged between one of the two inner links 41c of the lower parallel link group 41 and the central link 43c of the upper parallel link group 43 in FIGS. 15A to 16. Further, stoppers 26 and 27 are respectively arranged between the two outer links 41a and 41b of the lower parallel link group 41 and the two outer links 43a and 43b of the upper parallel link group 43. The second lock means 14 of the lock means 15 is omitted.

The operation of the above-configured center-folding double link mechanism 39 is identical to that of the center-folding double link mechanisms 3A and 3B as described in the earlier embodiment. Accordingly, a description thereof is omitted.

Subsequently, an embodiment according to the second aspect of the present invention will be described based on FIGS. 17 to 21. In this embodiment, a pair of left and right center-folding double link mechanisms 48A and 48B installed on the traveling carriage 2 are each composed of a lower link pair 49 whose lower end is pivotally supported on the base 8 and an upper link 50 whose lower end is pivotally supported to the lower link pair 49. To an upper end of the upper link 50, the workpiece supports 4A or 4B is vertically swingably supported so as to protrude inward from the upper link 50 in a cantilever fashion. There are juxtaposed lock means 51 to hold the center-folding double link mechanisms 48A and 48B in an expanding-rising posture, which is taken when the workpiece supports 4A and 4B are vertically raised to a predetermined height, and workpiece support lock means 52 to hold the workpiece supports 4A and 4B in a horizontal posture with respect to the center-folding double link mechanisms 48A and 48B in the expanding-rising posture.

A further detailed description is given. The lower link pair 49 is composed of two links 49a and 49b located in parallel in the longitudinal direction. The links 49a and 49b have lower ends laterally swingably supported by mutually concentric, longitudinal, and horizontal spindles 54a and 54b to bearings 53a and 53b fixed on the base 8. The upper link 50 is positioned between the links 49a and 49b of the lower link pair 49. The upper link 50 has one end laterally swingably supported and connected at an intermediate position in the longitudinal direction of the links 49a and 49b by a longitudinal and horizontal spindle 50a. A free end of the upper link 50 is supported by a longitudinal and horizontal spindle 56 between a pair of pivot support members 55 fixed to a rod member 5 of the workpiece support 4A or 4B. The workpiece support 4A or 4B is vertically swingable about the spindle 56 with respect to the upper link 50. The workpiece supports 4A and 4B are each installed with a support auxiliary member 57 across arms 6a and 6b parallelly to the rod member 5. The support auxiliary members 57 and the rod members 5 are supported by forks F, whereby the workpiece supports 4A and 4B can be horizontally supported and vertically and parallelly elevated by the forks F. As a matter of course, the arms 6a and 6b may be supported by the forks F without providing such support auxiliary member 57, or a member having a horizontal supported surface may be fixed on the rod member 5 at a place to be supported by the forks F.

Figure 18:
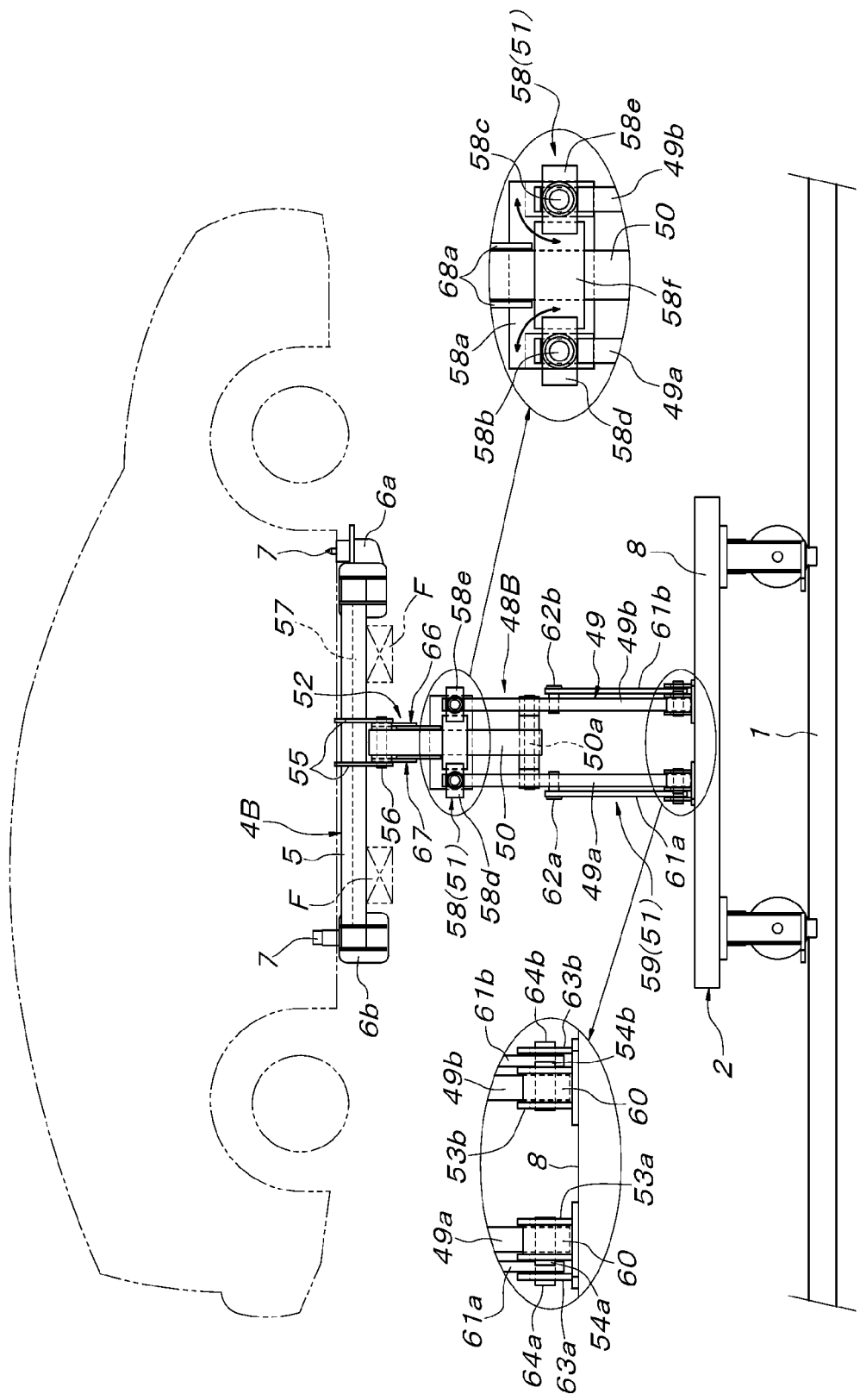
FIG. 18 is a side view of the above and an enlarged view of a part thereof.

The lock means 51 is composed of a first lock means 58 to lock the upper link 50 in a posture extended from the lower link pair 49 with respect thereto and a second lock means 59 to fix the lower link pair 49 in a vertically rising posture with respect to the base 8. The first lock means 58 is composed of a backing plate 58a fixedly arranged between inner free end portions of the two links 49a and 49b of the lower link pair 49, a pair of locking pieces 58d and 58e respectively rotatably supported at outer free end portions of the links 49a and 49b by spindles 58b and 58c perpendicular to the longitudinal direction of the links 49a and 49b and also perpendicular to the spindle 56, and a locked plate 58f fixed on an outer surface of the upper link 50 at a place positioned between the paired locking pieces 58d and 58e when the upper link 50 takes the posture extended from the lower link pair 49, so as to project toward both sides where the paired locking pieces 58d and 58e are located. The paired locking pieces 58d and 58e are configured to be switchable in an alternative way between a non-locking posture parallel to the links 49a and 49b as shown in FIG. 18 and a locking posture perpendicular to the links 49a and 49b.

The second lock means 59 is composed of stoppers 60 incorporated into the bearings 53a and 53b, two locking arms 61a and 61b, and locked pins 62a and 62b projected outward from respective links 49a and 49b of the lower link pair 49 so as to be engaged with the locking arms 61a and 61b, in order to prevent the links 49a and 49b of the lower link pair 49 from swinging outward from the vertically rising posture with respect to the base 8. The two locking arms 61a and 61b are adjoined outside respective links 49a and 49b of the lower link pair 49 and vertically swingably supported by longitudinal and horizontal spindles 64a and 64b to bearings 63a and 63b fixed on the base 8 so as to be positioned inwardly away from the bearings 53a and 53b of the links 49a and 49b in a side view. The locking arms 61a and 61b are formed with guiding long holes 65 in such a manner as to continue from appropriate intermediate positions to free ends thereof, through which holes 65 the locked pins 62a and 62b slidably pass. The guiding long holes 65 have distal ends respectively formed with bent locking recessed portions 65a (see FIG. 19A) to which the locked pins 62a and 62b are fitted due to that the locking arms 61a and 61b are tilted downward by gravity when the links 49a and 49b of the lower link pair 49 take the vertically rising posture with respect to the base 8, thereby preventing the links 49a and 49b from tilting inward.

Figure 17:
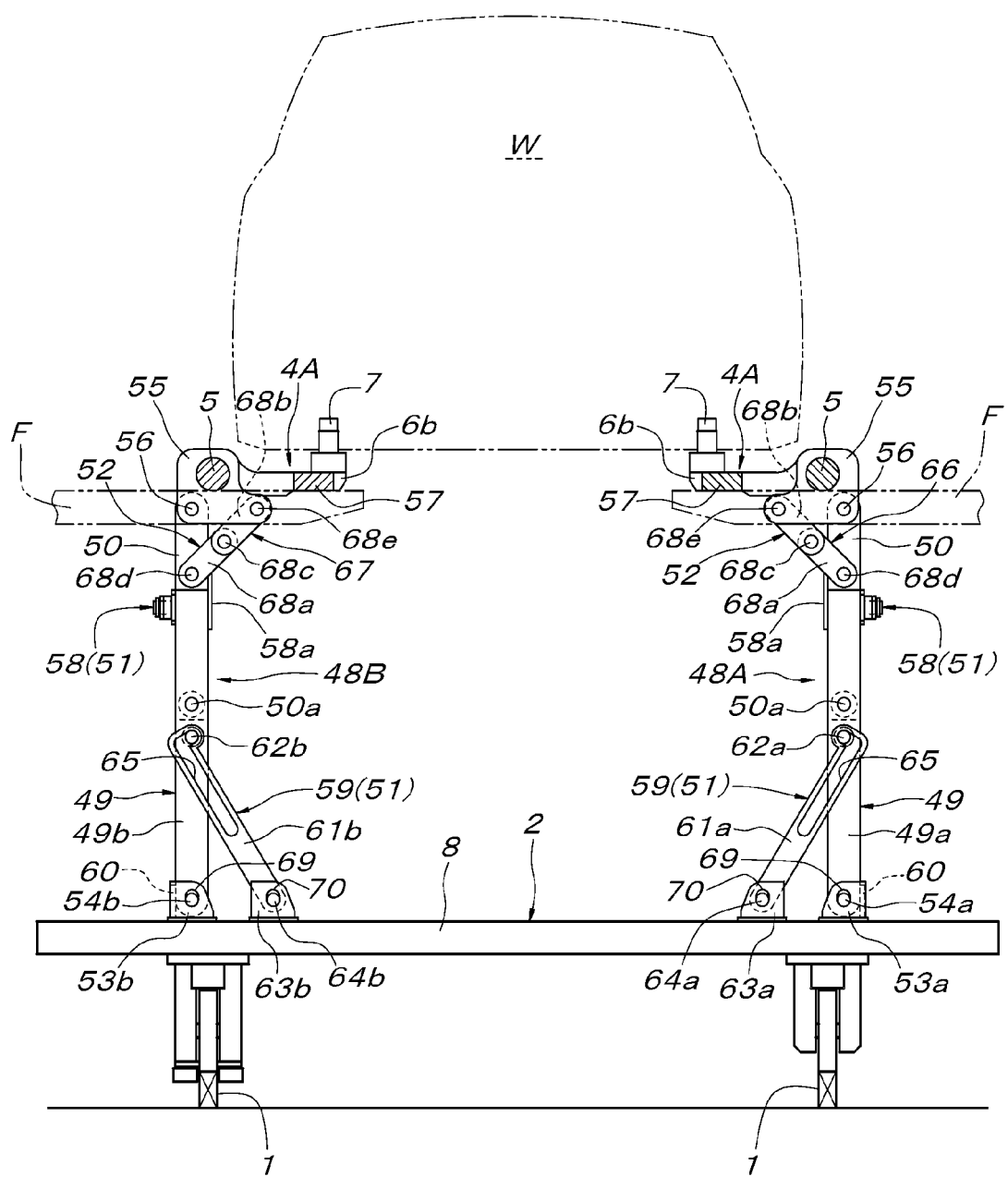
FIG. 17 is a partially cutaway front view showing a state where a workpiece is supported at the highest position in an embodiment of the second aspect of the present invention.

The workpiece support lock means 52 is composed of a pair of left and right center-folding double links 66 and 67 arranged between the upper link 50 and the pivot support members 55, and the afore-described backing plate 58a of the first lock means 58. The center-folding double links 66 and 67 each include two links 68a and 68b supported and connected by a longitudinal and horizontal spindle 68c. The inner links 68a have free ends swingably supported by a longitudinal and horizontal spindle 68d on both lateral surfaces of the upper link 50. The outer links 68b have free ends swingably supported by a longitudinal and horizontal spindle 68e on respective inner lateral surfaces of the pivot support members 55. When the center-folding double link mechanisms 48A and 48B are in the expanding-rising posture and also the workpiece supports 4A and 4B are oriented perpendicular and horizontal with respect to the upper links 50, as shown in FIG. 17, the center-folding double links 66 and 67 expand linearly with a substantially 45 degree inclination in inner corners between the upper links 50 and the pivot support members 55 of the workpiece supports 4A and 4B or expand into a state where the central spindles 68c are positioned slightly lower than imaginary straight lines joining the spindles 68d and 68e at both ends, and at the same time, lower lateral surfaces on the upper link 50 sides of the links 68a are supported by upper lateral surfaces of the backing plates 58a of the first lock means 58, thereby preventing the center-folding double links 66 and 67 from bending downward.

It is noted that shaft holes 69 in which the spindles 54a and 54b of the bearings 53a and 53b on the base 8 side supporting the links 49a and 49b of the lower link pair 49 are supported and shaft holes 70 in which the spindles 64a and 64b of the bearings 63a and 63b on the base 8 side supporting the locking arms 61a and 61b of the second lock means 59 are supported are rendered vertically long so as to allow the links 49a and 49b and the locking arms 61a and 61b to be pulled upward.

In the above configuration, the lower link pairs 49 are rotated about the spindles 54a and 54b toward the inner sides of being away from the stoppers 60 and the upper links 50 are rotated outward about the spindles 50a with respect to the lower link pairs 49, in the state where the locked pins 62a and 62b of the second lock means 59 can slide within the guiding long holes 65 of the locking arms 61a and 61b. As a result, the pivot support members 55 are rotated downward about the spindles 56 while the center-folding double links 66 and 67 of the workpiece support lock means 52 are folded down by gravity (a spring force may be used together) in such a direction that the central spindles 68c are separated from the spindles 56 at upper ends of the upper links 50. Then, as shown in FIG. 19, the lower link pairs 49, the upper links 50, and the pivot support members 55 are folded zigzag and fallen down on the base 8. At this moment, the locking arms 61a and 61b at both sides of the lower link pairs 49 rotate about the spindles 64a and 64b in the same direction as the lower link pairs 49, and the upper links 50 are fallen down reversely between the links 49a and 49b of the lower link pairs 49, and the center-folding double links 66 and 67 are folded down at both sides of the upper links 50, whereupon all of them become parallel at the same level as the lower link pairs 49. Further, the pivot support members 55 are supported in the horizontal posture outside the center-folding double links 66 and 67 and between the links 49a and 49b of the lower link pairs 49.

Figure 20:
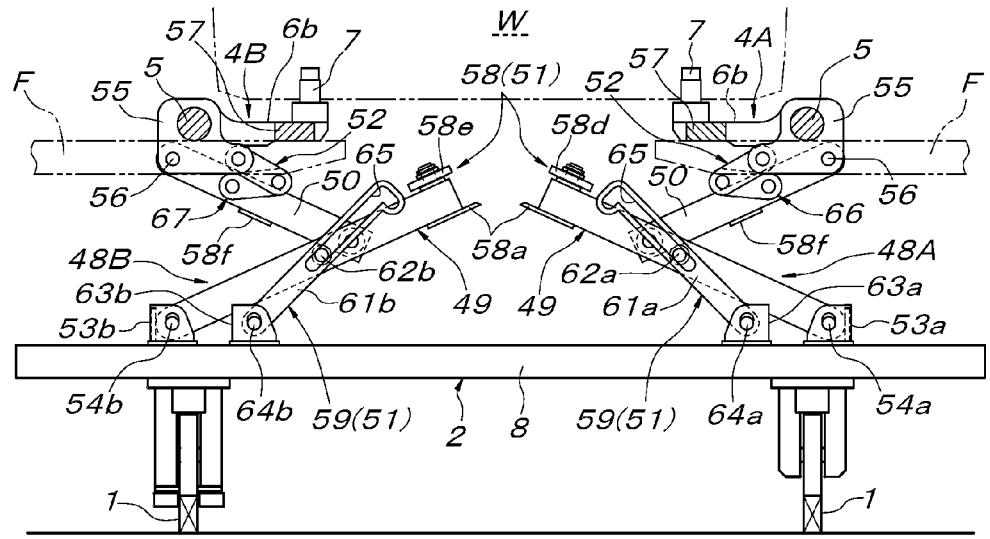
FIG. 20 is a partially cutaway front view showing an intermediate first stage from the state shown in FIG. 19A to the state shown in FIG. 17.
Figure 21:
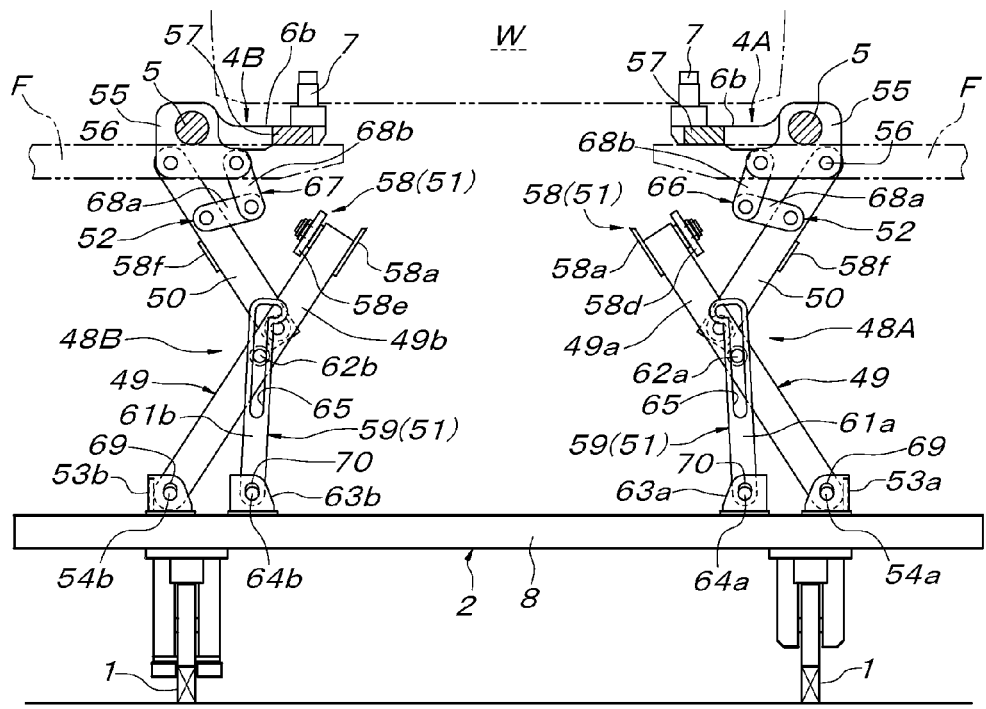
FIG. 21 is a partially cutaway front view showing an intermediate second stage of the same.

The paired left and right workpiece supports 4A and 4B fixedly supported to the pivot support members 55 via the rod members 5 are stable at the lowest positions by bringing the center-folding double link mechanisms 48A and 48B into the folded fallen-down posture in the above manner. Thus, the workpiece W can be loaded and supported on the workpiece supports 4A and 4B in this state. To raise the workpiece W to the highest position, lifter forks F are inserted under the rod members 5 and the support auxiliary members 57 at both sides of the center-folding double link mechanisms 48A and 48B and then are raised, whereby the workpiece supports 4A and 4B are vertically raised by the forks F while held in the horizontal posture, in the same manner as the earlier embodiment. Along with this vertical parallel ascent of the workpiece supports 4A and 4B, the lower link pairs 49 rotate and rise outward about the spindles 54a and 54b, and the upper links 50 rotate and rise inward about the spindles 50a with respect to the lower link pairs 49, as shown in FIG. 20 and FIG. 21. The links 68a and 68b of the center-folding double links 66 and 67 rotate about the central spindles 68c in the expanding direction as inner corner angles formed between the upper links 50 and the support pivot members 55 increase. Further, the locking arms 61a and 61b are pulled upward by the locked pins 62a and 62b of the lower link pairs 49 via the guiding long holes 65 and rotate and rise about the spindles 64a and 64b in synchronization with the lower link pairs 49.

Once the workpiece supports 4A and 4B are raised until the lower link pairs 49 and the upper links 50 become vertical collinear with respect to the base 8, the links 49a and 49b of the lower link pairs 49 abut against the stoppers 60 juxtaposed in the bearings 53a and 53b, thereby being prevented from further rotating outward, as shown in FIG. 17. At this moment, the locked pins 62a and 62b of the lower link pairs 49 reach the distal ends of the guiding long holes 65 of the locking arms 61a and 61b. Accompanied by slight downward rotations of the locking arms 61a and 61b by gravity (a spring force may be used together), the locked pins 62a and 62b are fitted into the bent locking recessed portions 65a of the guiding long holes 65 and then prevent the lower link pairs 49 from rotating toward the direction of returning to the initial fallen-down posture. Thus, the lower link pairs 49 are automatically held in the vertically rising posture. On the other hand, the upper links 50 abut against the backing plates 58a of the lower link pairs 49 and are prevented from further rotating inward. In this state, the locking pieces 58d and 58e of the first lock means 58 are rotated 90 degrees from the non-locking posture parallel to the links 49a and 49b and are switched into the locking posture, as shown in FIG. 18. The ends of the locking pieces 58d and 58e are superposed on outer sides of both lateral surfaces of the locked plates 58f of the upper links 50. The upper links 50 are put between the backing plates 58a and the ends of the locking pieces 58d and 58e, thereupon rendering the rotations of the upper links 50 about the spindles 50a with respect to the lower link pairs 49 impossible. Furthermore, the pivot support members 55 (the workpiece supports 4A and 4B) take the horizontal posture perpendicular and inward-facing with respect to the upper links 50, so that the center-folding double links 66 and 67 between the upper links 50 and the pivot support members 55 expand linearly with a 45 degree inclination, and at the same time, the lower links 68a are received at upper lateral surfaces of the backing plates 58a on the upper link 50 side, whereupon the center-folding double links 66 and 67 serve as braces which support the pivot support members 55 (the workpiece supports 4A and 4B) in the horizontal posture perpendicular and inward-facing with respect to the upper links 50.

As obvious from the afore-described operation, the center-folding double link mechanisms 48A and 48B are automatically locked in the then expanding-rising posture of being vertically linear by the lock means 51 composed of the first and second lock means 58 and 59, when the workpiece supports 4A and 4B are raised until the lower link pairs 49 and the upper links 50 become vertically collinear with respect to the base 8. The workpiece supports 4A and 4B are also automatically locked in a workpiece supporting posture of horizontally projecting inward from the upper links 50 by the workpiece support lock means 52 with respect to the center-folding double link mechanisms 48A and 48B in the expanding-rising posture. Thus, the forks F are lowered and pulled outside in this state, whereby the raising of the workpiece W to the highest position is completed.

To lower the workpiece W having been supported at the highest position to the initial lowest position, the forks F are inserted under the workpiece supports 4A and 4B and raised as described above, whereby the workpiece supports 4A and 4B are supported by the forks F. At this moment, the workpiece supports 4A and 4B stable at the highest positions are operated in such a manner as to be further lifted up by the forks F. As a result, the spindles 54a and 54b on the base 8 side of the lower link pairs 49 and the spindles 64a and 64b on the base 8 side of the locking arms 61a and 61b move upward within the shaft holes (long holes) 69 and 70 of the bearings 53a, 53b, 63a, and 63b respectively, and the entire center-folding double link mechanisms 48A and 48B are floated from the base 8 within vertical clearances of the spindles 54a, 54b, 64a, and 64b in the shaft holes (long holes) 69 and 70. Since no load is applied to the locking pieces 58d and 58e of the first lock means 58 and the locking arms 61a and 61b of the second lock means 59 in this state, the locking pieces 58d and 58e are switched into the non-locking posture of being separated from the locked plates 58 of the upper links 50 and also the locking arms 61a and 61b are swung inward in this state, whereupon the locked pins 62a and 62b of the lower link pairs 49 are separated from the bent locking recessed portions 65a of the guiding long holes 65 of the locking arms 61a and 61b.

After the afore-described operation, the forks F supporting the workpiece supports 4A and 4B are vertically lowered while an operating physical force having a direction of bending the center-folding double link mechanisms 48A and 48B inward is acted upon at appropriate places from the lower ends of the lower link pairs 49 to the upper ends of the upper links 50, if necessary. Accompanied by the inward rotations of the lower link pairs 49 and locking arms 61a and 61b, the outward rotations of the upper links 50, and the bending and folding of the center-folding double links 66 and 67, the workpiece supports 4A and 4B are vertically and parallelly lowered, thereby allowing their supporting workpiece W to be lowered to the initial lowest position.

Similar to the earlier embodiment, a switching means (an actuator) to switch the locking pieces 58d and 58e of the first lock means 58 between the locking posture and the non-locking posture or a biasing means to bias the locking arms 61a and 61b inward only at the time of workpiece unloading can be provided to the workpiece elevating support device on the traveling carriage 2. These means can also be juxtaposed to the lifter equipped with the forks F.

Figure 22:
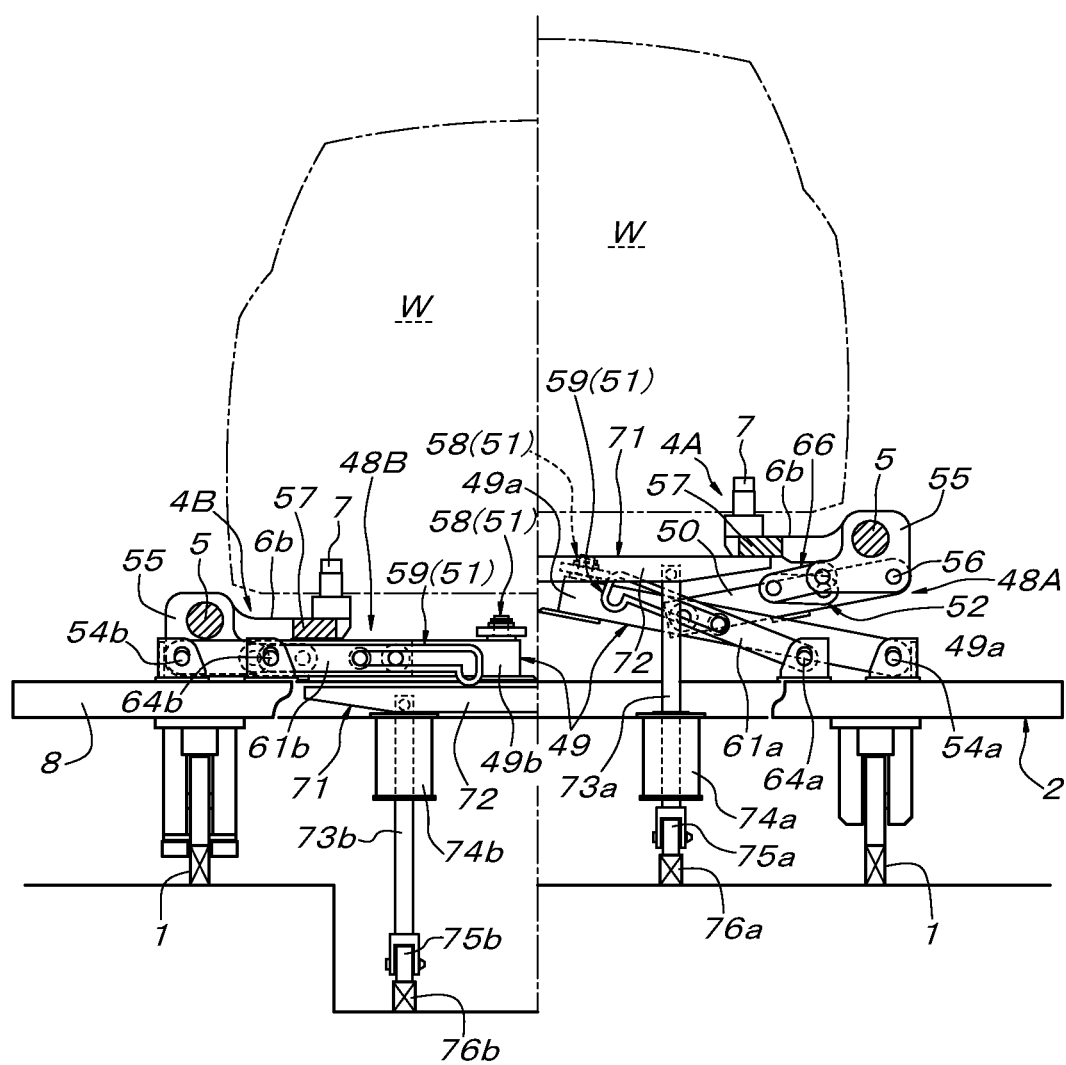
FIG. 22 is a partially cutaway front view showing the first variation of the embodiment of the second aspect in which a right half shows a state where a workpiece support is pushed up to an intermediate height position and a left half shows a state where the workpiece support is lowered to the lowest position.

The elevation drive with the use of the cam rails as shown in FIG. 13 can be combined in the above embodiment shown in FIGS. 17 to 21, too. More specifically, as shown in FIG. 22, elevating bodies vertically movable with respect to the base 8 of the traveling carriage 2 are elevated by cam rails laid along the carriage traveling path, whereby the workpiece supports 4A and 4B are elevated between the lowest positions and intermediate height positions. However, the workpiece supports 4A and 4B in this embodiment are vertically swingable about the spindles 56 with respect to the center-folding double link mechanisms 48A and 48B (the upper links 50) and are held in the horizontal posture by the workpiece support lock means 52 only when the center-folding double link mechanisms 48A and 48B are in the expanding-rising posture. Thus, the configuration that the lower link pairs 49 and the upper links 50 are thrust up by the elevating bodies 34 (the elevating rods 36a and 36b) as in the embodiment shown in FIG. 13 cannot be employed. Accordingly, as shown in FIG. 22, elevating bodies 71 are composed of an elevating support 72 capable of supporting and elevating the workpiece supports 4A and 4B by both ends thereof and elevating rods 73a and 73b supporting this elevating support 72 at left and right sides. The elevating rods 73a and 73b are configured to vertically movably penetrate the base 8 via elevation guides 74a and 74b provided to the base 8. Cam follower rollers 75a and 75b pivotally supported at respective lower ends of the elevating rods 73a and 73b are configured to roll on cam rails 76a and 76b.

It is noted that both workpiece supports 4A and 4B are shown as elevated by one elevating support 72. However, a pair of front and rear elevating supports 72 can be provided so as to support the workpiece supports 4A and 4B at both sides of the center-folding double link mechanisms 48A and 48B. The elevating rods 73a and 73b equipped with the cam follower rollers 75a and 75b as shown, the elevation guides 74a and 74b, and the cam rails 76a and 76b can be provided to each elevating support 72 to individually and synchronously elevate the elevating supports 72.

Figure 23:
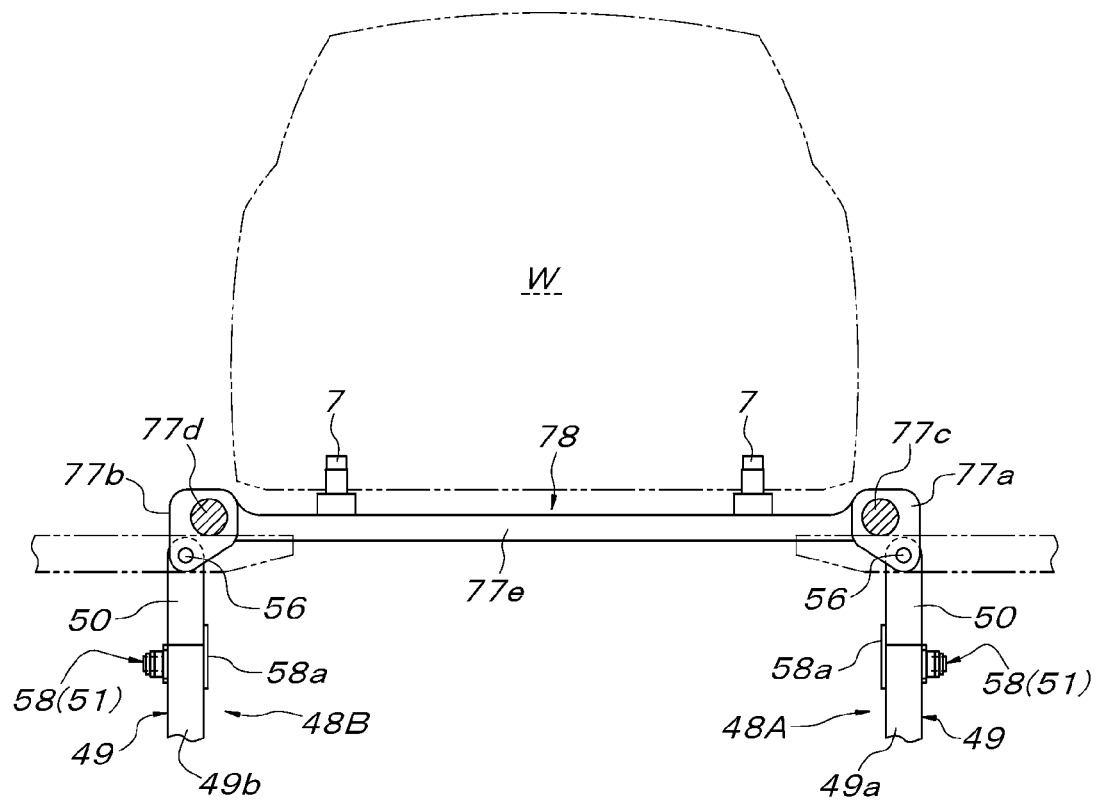
FIG. 23 is a front view of a main part showing an embodiment of the third aspect of the present invention.

In an embodiment as shown in FIG. 23, the upper ends of the upper links 50 of the paired left and right center-folding double link mechanisms 48A and 48B of the embodiment as shown in FIGS. 17 to 21 are connected to pivot support members 77a and 77b by the spindles 56 swingably. Central portions of longitudinal rod members 77c and 77d are fixed to the pivot support members 77a and 77b. Front ends and rear ends of the rod members 77c and 77d are connected and integrated with each other by connecting members 77e. In this manner, a workpiece support 78 having a rectangular frame shape is constructed. The workpiece support tools 7 can be projected on, for example, the front and rear connecting members 77e. According to this configuration, the workpiece support 78 is restricted in posture when the center-folding double link mechanisms 48A and 48B take the expanding-rising posture and are locked by the first and second lock means 58 and 59 of the lock means 51. Thus, the workpiece support lock means 52 becomes unnecessary. Further, the front and rear connecting members 77 can be configured to be thrust up directly by the elevating rods also when the elevation drive with the use of the cam rails as shown in FIG. 22 is combined. Therefore, the elevating support 72 can be rendered unnecessary. As a matter of course, the rod members 5 have only to be supported when the workpiece support 78 is lifted up by the forks F, so that the need to configure the workpiece supports 4A and 4B to be individually and horizontally supported is eliminated.

Figure 24:
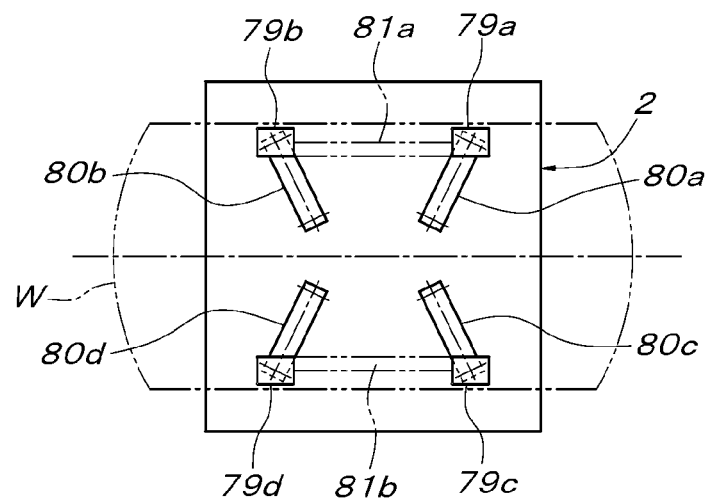
FIG. 24 is a schematic plan view showing another embodiment.

It is noted that, in each of the afore-described embodiments, a pair of left and right workpiece support 4A and 4B capable of supporting the workpiece W at the front and rear of both lateral surfaces are supported by a pair of left and right center-folding double link mechanisms. However, as shown in FIG. 24, there can be arranged four workpiece supports 79a to 79d supporting the workpiece W respectively at the front and rear of both lateral surfaces, and these workpiece supports 79a to 79d can be respectively supported by independent center-folding double link mechanisms 80a to 80d. In that case, the front and rear workpiece supports 79a and 79b, and 79c and 79d may be respectively connected and integrated by connecting members 81a and 81b. This configuration is substantially the same as the configuration that the workpiece supports of the embodiments as shown above, that is, the paired left and right workpiece supports 4A and 4B provided with workpiece support tools 7 respectively at front and rear ends thereof are respectively supported by the center-folding double link mechanisms at the front and rear. Furthermore, a single workpiece support 29 and 78 having a rectangular frame shape can be supported by four center-folding double link mechanisms 80a to 80d, as well.

When the workpiece support is vertically elevatably supported by the four center-folding double link mechanisms 80a to 80d as described above, the center-folding double link mechanisms 80a to 80d can be arranged so as for longitudinal directions of the links thereof in the folded fallen-down posture to incline in both lateral and longitudinal directions and to be disposed radially from a central portion of their supporting workpiece W but not to be disposed in parallel with the lateral direction (the longitudinal direction depending on the traveling direction of the traveling carriage 2), as shown in FIG. 24. As a matter of course, the workpiece supports 79a to 79d respectively supported by the center-folding double link mechanisms 80a to 80d can elevate vertically and parallelly, and accordingly, there is no problem in elevation even if the workpiece supports 79a to 79d are connected two by two or connected all together.

The paired left and right center-folding double link mechanisms 3A, 3B, 39, 48A, and 48B in the above-described embodiments are all supported on the upper surface of the base 8 of the traveling carriage 2 while being in the folded fallen-down posture of being fallen down inward. That is, the link mechanisms are not configured to be housed in the base 8 of the traveling carriage 2. According to this configuration, not only does a part of the center-folding double link mechanisms in the folded fallen-down posture not project outward from both lateral sides of the base 8 of the traveling carriage 2 but also the traveling carriage 2 can be composed of a flat-plate base 8. Therefore, the traveling carriage 2 is also favorable as a friction-drive traveling carriage in which both lateral surfaces of the traveling carriage 2 (the base 8) are made to serve as friction drive surfaces, to which friction drive wheels arranged aside of the traveling path are press-contacted, thereby driving the traveling carriage 2.

Hereinbefore, a plurality of embodiments are described. However, the configuration of each embodiment should not be restricted thereto, and the embodiments can be mutually combined to configure other embodiments. Further, the workpiece elevating support device of the present invention is one that can be utilized by being installed on the traveling carriage, but can also be used as a fixed workpiece elevating support device by placing the base on the floor surface.

INDUSTRIAL APPLICABILITY

The workpiece elevating support device according to the present invention can be utilized as a carriage-type conveying apparatus for conveying an automobile body while changing the height thereof in each section in an automobile assembly line, by being installed on a traveling carriage which conveys the automobile body.

What is claimed is:

1. A workpiece elevating support device comprising:
a pair of left and right center-folding double link mechanisms arranged in parallel on a base;
a pair of left and right workpiece supports supporting both lateral side portions of a workpiece and being long in a front-rear direction; and;
a lock means,
wherein the center-folding double link mechanisms are each composed of an intermediate link member, a lower parallel link interposed between the intermediate link member and the base, an upper link member supporting a longitudinal intermediate position of one of the workpiece supports, and an upper parallel link interposed between the intermediate link member and the upper link member, and
the link mechanisms can rise and fall between a folded fallen-down posture of being folded and fallen down on the base and an expanding-rising posture of vertically raising the workpiece supports to a predetermined height, and
the lock means holds each of the center-folding double link mechanisms in the expanding-rising posture, and
a lifter is arranged outside the base, and the lifter has left and right pairs of front and rear forks supporting the pair of left and right workpiece supports at both front and rear sides of each center-folding double link mechanism, and by vertical elevation of the forks, the workpiece supports are configured to vertically and parallelly elevate between a lowest position wherein each center-folding double link mechanism is in the folded fallen-down posture and a highest position wherein each center-folding double link mechanism is in the expanding-rising posture and is held by the lock means, and
each center-folding double link mechanism in the expanding-rising posture held by the lock means is configured to support the workpiece support without support by the forks, at the highest position.

2. The workpiece elevating support device according to claim 1, wherein the workpiece support is projected inward from the upper link member of each of the center-folding double link mechanisms in the expanding-rising posture toward the other center-folding double link mechanism, and each of the center-folding double link mechanisms is folded down inward toward the other center-folding double link mechanism from the expanding-rising posture.

3. The workpiece elevating support device according to claim 1, wherein the lock means is composed of a first lock means to control an angle between the lower parallel link and upper parallel link of each of the center-folding double link mechanisms and a second lock means to control an angle between the lower parallel link of each of the center-folding double link mechanisms and the base.

4. The workpiece elevating support device according to claim 1, wherein the expanding-rising posture of the two parallel center-folding double link mechanisms held by the lock means is such a center-bulging symmetry that positions of the intermediate link members protrude outward.

5. The workpiece elevating support device according to claim 1, wherein the expanding-rising posture of the two parallel center-folding double link mechanisms held by the lock means is such a center-constricted symmetry that positions of the intermediate link members) protrude inward.

6. The workpiece elevating support device according to claim 1, wherein the upper link members of the center-folding double link mechanisms are connected and integrated by a connecting member.

7. The workpiece elevating support device according to claim 1, wherein the center-folding double link mechanisms each have a spindle swingably supporting the lower parallel link at one end thereof and a spindle swingably supporting one end of the upper parallel link and a free end of the lower parallel link, and each spindle thereof is positioned in a same horizontal plane while taking the folded fallen-down posture.

8. The workpiece elevating support device according to claim 1, wherein the base is composed of a carriage which travels on a constant traveling path, and the lifter is arranged on the path aside of a switching point of a workpiece supporting height in the traveling path of the carriage.

9. The workpiece elevating support device according to claim 1, further comprising an elevating body provided to the carriage, and a cam rail, wherein the elevating body makes each of the center-folding double link mechanisms rise and fall through elevation thereof between the folded fallen-down posture and an intermediate expanding-rising posture lower than the expanding-rising posture, and the cam rail is laid on the traveling path of the carriage so as to elevate the elevating body along with traveling of the carriage.

10. A workpiece elevating support device comprising:
a pair of left and right center-folding double link mechanisms arranged in parallel on a base;
a pair of left and right workpiece supports supporting both lateral side portions of a workpiece and being long in a front-rear direction;
a lock means; and
a workpiece support lock means,
wherein the center-folding double link mechanisms are each composed of a lower link having a lower end pivotally supported on the base and an upper link having a lower end pivotally supported to the lower link and an upper end to which a longitudinal intermediate position of the workpiece support is vertically swingably supported, and
the link mechanisms can rise and fall between a folded fallen-down posture of being folded and fallen down on the base and an expanding-rising posture of vertically raising the workpiece supports to a predetermined height, and
the lock means holds each of the center-folding double link mechanisms in the expanding-rising posture, and the workpiece support lock means holds the workpiece supports in a horizontal posture with respect to each of the center-folding double link mechanisms in the expanding-rising posture, and a lifter is arranged outside the base, and the lifter has left and right pairs of front and rear forks supporting the pair of left and right workpiece supports at both front and rear sides of each center-folding double link mechanism, and by vertical elevation of the forks, the workpiece supports are configured to vertically and parallelly elevate between a lowest position wherein each center-folding double link mechanism is in the folded fallen-down posture and a highest position wherein each center-folding double link mechanism is in the expanding-rising posture and is held by the lock means, and each center-folding double link mechanism in the expanding-rising posture held by the lock means is configured to support the workpiece support without support by the forks, at the highest position.

11. A workpiece elevating support device comprising:

a pair of left and right center-folding double link mechanisms arranged in parallel on a base;

one workpiece support supporting both lateral side portions of a workpiece; and a lock means, wherein the center-folding double link mechanisms are each composed of a lower link having a lower end pivotally supported on the base and an upper link having a lower end pivotally supported to the lower link and an upper end connected with that of the other center-folding double link mechanism by the one workpiece support, and the link mechanisms can rise and fall between a folded fallen-down posture of being folded and fallen down on the base and an expanding-rising posture of vertically raising the workpiece support to a predetermined height, and the lock means holds each of the center-folding double link mechanisms in the expanding-rising posture, and a lifter is arranged outside the base, and the lifter has left and right pairs of front and rear forks supporting the workpiece supports at both front and rear sides of each center-folding double link mechanism, and by vertical elevation of the forks, the workpiece supports are configured to vertically and parallelly elevate between a lowest position wherein each center-folding double link mechanism is in the folded fallen-down posture and a highest position wherein each center-folding double link mechanism is in the expanding-rising posture and is held by the lock means, and each center-folding double link mechanism in the expanding-rising posture held by the lock means is configured to support the workpiece support without support by the forks, at the highest position.

12. The workpiece elevating support device according to claim 10, wherein the workpiece support is projected inward from each of the center-folding double link mechanisms in the expanding-rising posture toward the other center-folding double link mechanism, and each of the center-folding double link mechanisms is folded down inward toward the other center-folding double link mechanism from the expanding-rising posture.

13. The workpiece elevating support device according to claim 10, wherein the lock means is composed of a first lock means to control an angle between the lower link and upper link of each of the center-folding double link mechanisms and a second lock means to control an angle between the lower link of each of the center-folding double link mechanisms and the base.

14. The workpiece elevating support device according to claim 10, wherein the center-folding double link mechanisms each have the lower link and the upper link positioned in a same horizontal plane while taking the folded fallen-down posture.

15. The workpiece elevating support device according to claim 10, wherein the base is composed of a carriage which travels on a predetermined traveling path, and the lifter is arranged on the path aside of a switching point of a workpiece supporting height in the traveling path of the carriage.

16. The workpiece elevating support device according to claim 15, further comprising an elevating body provided to the carriage, and a cam rail, wherein the elevating body makes each of the center-folding double link mechanisms rise and fall through elevation thereof between the folded fallen-down posture and an intermediate expanding-rising posture lower than the expanding-rising posture, and the cam rail is laid on the traveling path of the carriage so as to elevate the elevating body along with traveling of the carriage.

17. The workpiece elevating support device according to claim 11 wherein the base is composed of a carriage which travels on a constant traveling path, and the lifter is arranged on the path aside of a switching point of a workpiece supporting height in the traveling path of the carriage.

18. The workpiece elevating support device according to claim 17 further comprising an elevating body provided to the carriage, and a cam rail, wherein the elevating body makes each of the center-folding double link mechanisms rise and fall through elevation thereof between the folded fallen-down posture and an intermediate expanding-rising posture lower than the expanding-rising posture, and the cam rail is laid on the traveling path of the carriage so as to elevate the elevating body along with traveling of the carriage.

* * * * *